United States Patent
Ukai et al.

(10) Patent No.: US 11,143,872 B2
(45) Date of Patent: Oct. 12, 2021

(54) WAVEGUIDE AND VIDEO IMAGE DISPLAY DEVICE

(71) Applicant: Hitachi-LG Data Storage, Inc., Tokyo (JP)

(72) Inventors: Ryuji Ukai, Tokyo (JP); Tomoto Kawamura, Tokyo (JP); Satoshi Ouchi, Tokyo (JP); Yoshiho Seo, Tokyo (JP); Seiji Murata, Tokyo (JP)

(73) Assignee: HITACHI-LG DATA STORAGE, INC., Tokyo (JP)

( * ) Notice: Subject to any disclaimer, the term of this patent is extended or adjusted under 35 U.S.C. 154(b) by 0 days.

(21) Appl. No.: 16/652,690

(22) PCT Filed: Sep. 11, 2018

(86) PCT No.: PCT/JP2018/033605
§ 371 (c)(1),
(2) Date: Apr. 1, 2020

(87) PCT Pub. No.: WO2019/087576
PCT Pub. Date: May 9, 2019

(65) Prior Publication Data
US 2021/0041699 A1 Feb. 11, 2021

(30) Foreign Application Priority Data

Oct. 30, 2017 (JP) .............................. JP2017-209393

(51) Int. Cl.
*H04N 9/31* (2006.01)
*G02B 27/01* (2006.01)

(52) U.S. Cl.
CPC ....... *G02B 27/0172* (2013.01); *H04N 9/3152* (2013.01); *G02B 2027/013* (2013.01)

(58) Field of Classification Search
CPC .... G03B 21/008; G03B 21/28; G03B 21/208; G03B 21/2013; G03B 21/2033;
(Continued)

(56) References Cited

U.S. PATENT DOCUMENTS 10,330,938 B2 * 6/2019 Cheng ................. G02B 6/0055
2003/0165017 A1 9/2003 Amitai
(Continued)

FOREIGN PATENT DOCUMENTS

JP 2011-150231 A 8/2011
JP 2012-008356 A 1/2012
(Continued)

OTHER PUBLICATIONS

International Search Report of PCT/JP2018/033605 dated Dec. 4, 2018.
(Continued)

*Primary Examiner* — Sultan Chowdhury
(74) *Attorney, Agent, or Firm* — Mattingly & Malur, PC

(57) ABSTRACT

Both uniformity of brightness and uniformity of color of the outside world are seen via a waveguide. A video image is reflected by a partial reflection surface inside the waveguide that includes an incident surface on which video image light is incident, first and second internal reflection surfaces that propagate the video image light incident from the incident surface while totally reflecting the video image light, and are substantially parallel to each other. A plurality of partial reflection surfaces that reflect a part of the video image light propagating by being totally reflected by the first and second internal reflection surfaces, output the part of the video image light as output light from the first internal reflection surface to the outside of the waveguide, and transmit the part of the video image light being incident, and are disposed substantially parallel to each other inside the waveguide.

14 Claims, 20 Drawing Sheets

(58) Field of Classification Search
CPC ............ G03B 21/2053; G03B 21/2066; H04N 9/3152; H04N 9/3155; H04N 9/3164; H04N 9/3188; H04N 9/3197; G02B 2027/013; G02B 2027/0172; G02B 2027/0178
See application file for complete search history.

(56) References Cited

U.S. PATENT DOCUMENTS

| | | | |
|---|---|---|---|
| 2006/0228073 A1 | 10/2006 | Mukawa et al. | |
| 2013/0201094 A1* | 8/2013 | Travis | G09G 5/00 345/156 |
| 2018/0203237 A1* | 7/2018 | Shih | G02B 6/0028 |
| 2019/0101760 A1* | 4/2019 | Ayres | G02B 27/0172 |
| 2019/0129168 A1* | 5/2019 | Tan | G02B 26/06 |
| 2019/0293939 A1* | 9/2019 | Sluka | G02B 27/0075 |

FOREIGN PATENT DOCUMENTS

| | | |
|---|---|---|
| JP | 2017-142361 A | 8/2017 |
| TW | 201734562 A | 10/2017 |
| WO | 2005/093493 A1 | 10/2005 |

OTHER PUBLICATIONS

Chinese Office Action received in corresponding Chinese Application No. 201880063593.2 dated Jul. 5, 2021.

* cited by examiner

Fig.6A
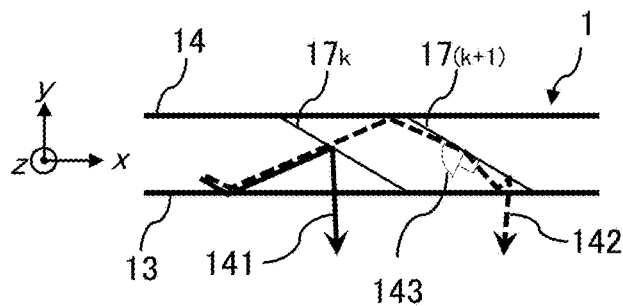
Fig.6B
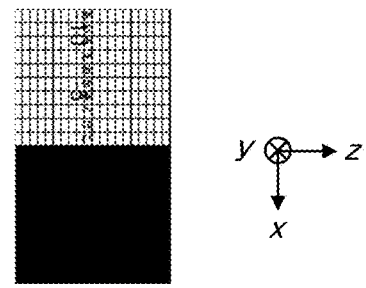
Fig.6C
| REFLECTANCE | 0.8% | 2% | 5% | 13% | 25% | 50% |
|---|---|---|---|---|---|---|
| IMAGE | | | | | | |
| GHOST VIDEO IMAGE LUMINANCE RATIO | 0.17% | 0.43% | 1.1% | 2.8% | 5.3% | 10.2% |
Fig.6D
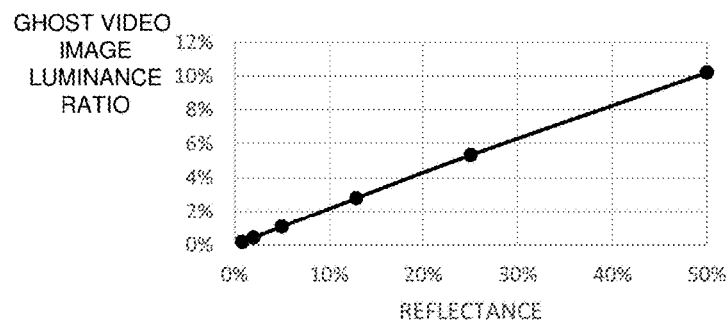

Fig.8

| | REFLECTANCE OF EACH SURFACE | INTENSITY OF VIDEO IMAGE LIGHT REFLECTED BY EACH SURFACE | TRANSMITTANCE OF NATURAL LIGHT |
|---|---|---|---|
| FIRST PARTIAL REFLECTION SURFACE | 12% | I1 = 12.0% | 88% |
| SECOND PARTIAL REFLECTION SURFACE | 12% | I2 = 10.6% | 88% |
| THIRD PARTIAL REFLECTION SURFACE | 12% | I3 = 19.3% | 88% |
| FOURTH PARTIAL REFLECTION SURFACE | 12% | I4 = 8.2 % | 88% |
| FIFTH PARTIAL REFLECTION SURFACE | 12% | I5 = 7.2 % | 88% |
| SIXTH PARTIAL REFLECTION SURFACE | 12% | I6 = 6.3 % | 88% |

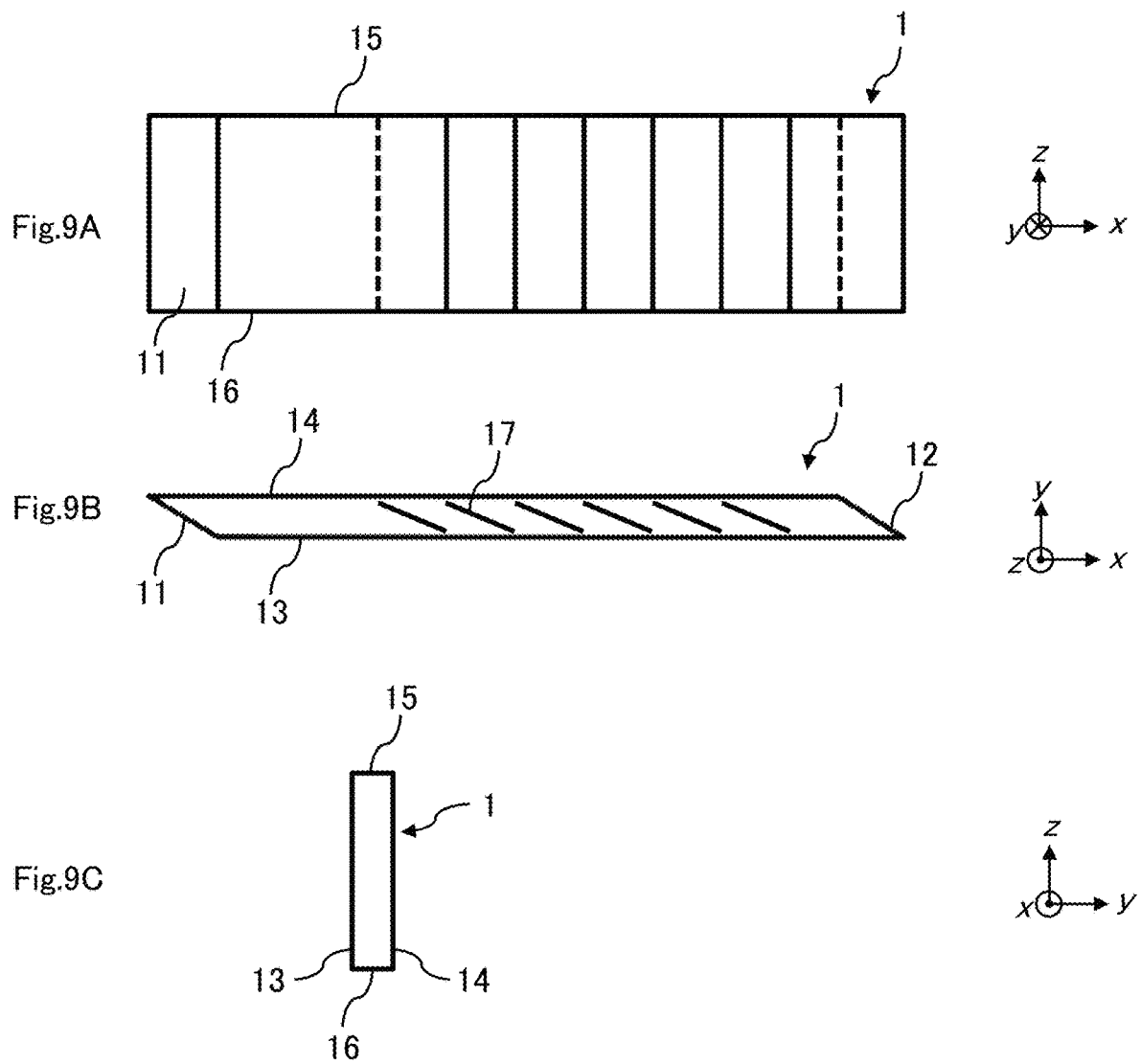

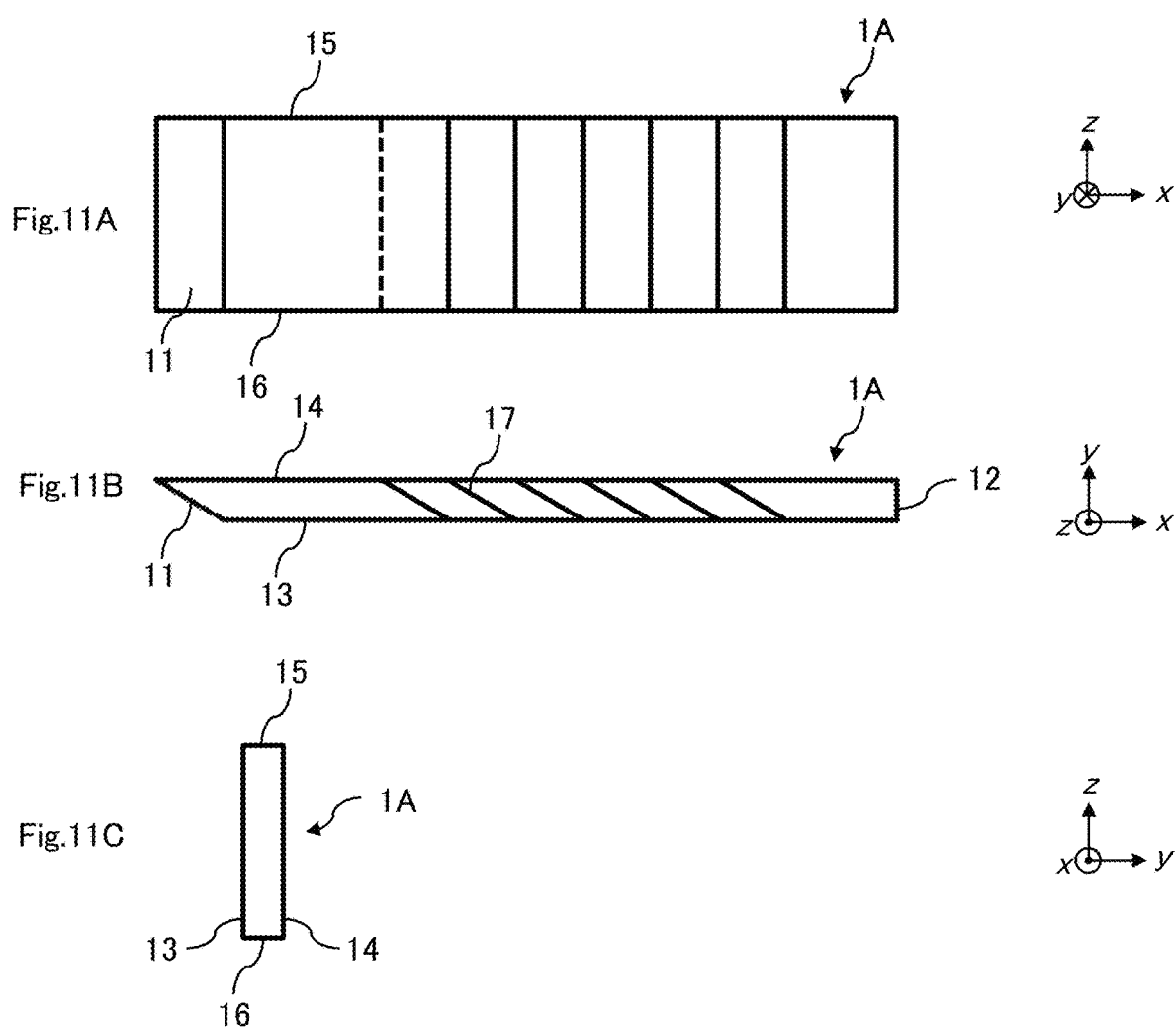

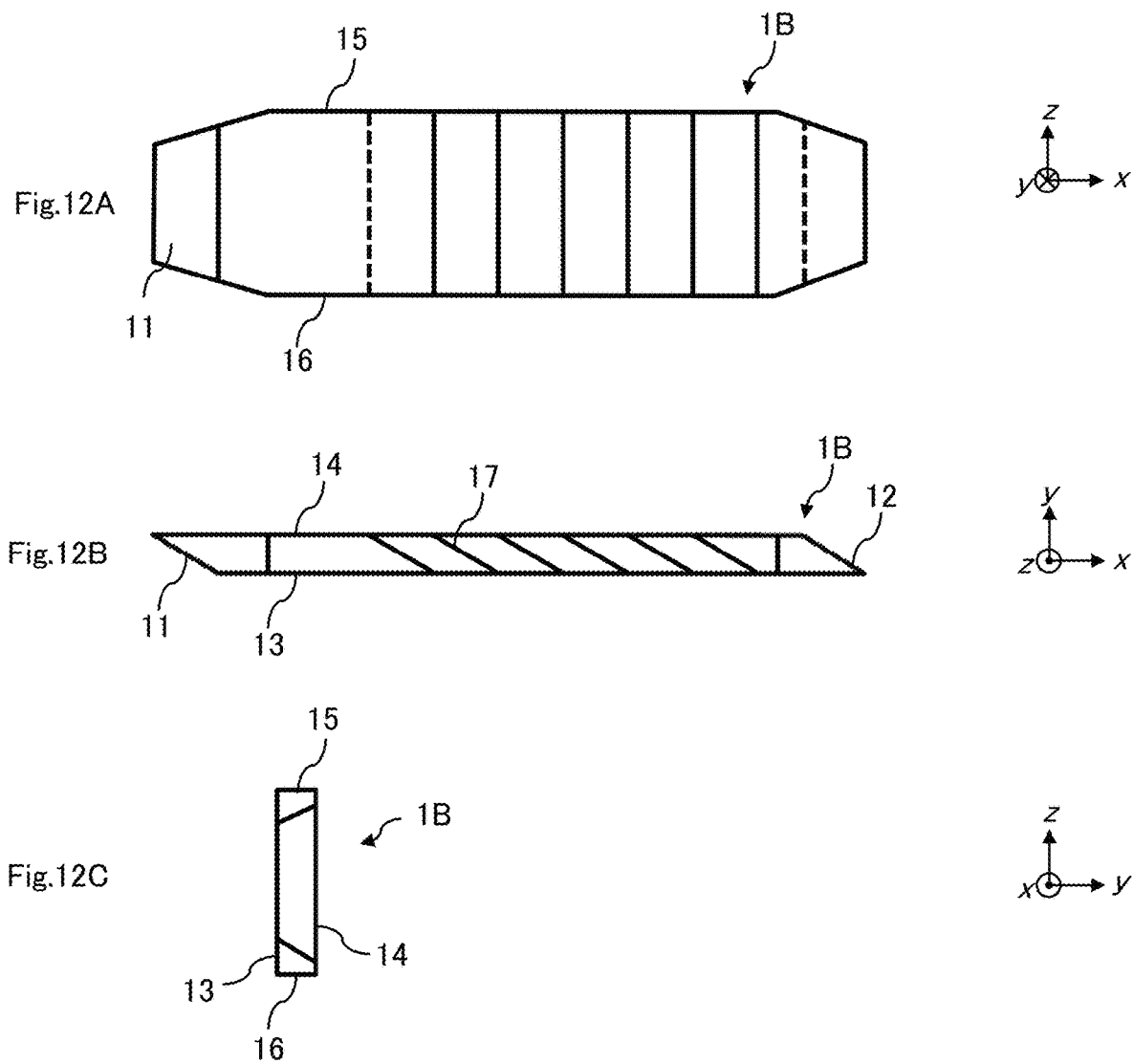

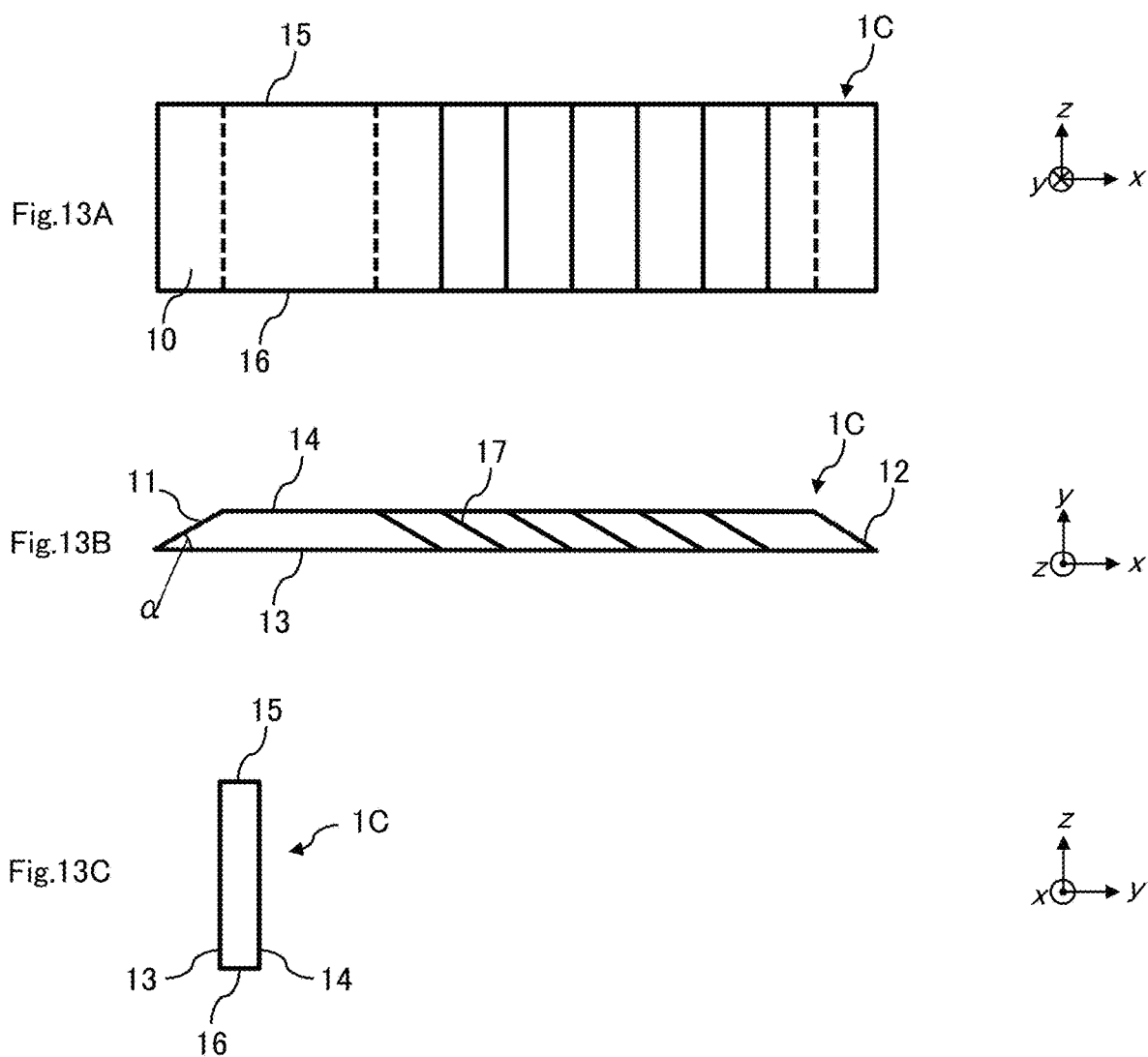

Fig.14
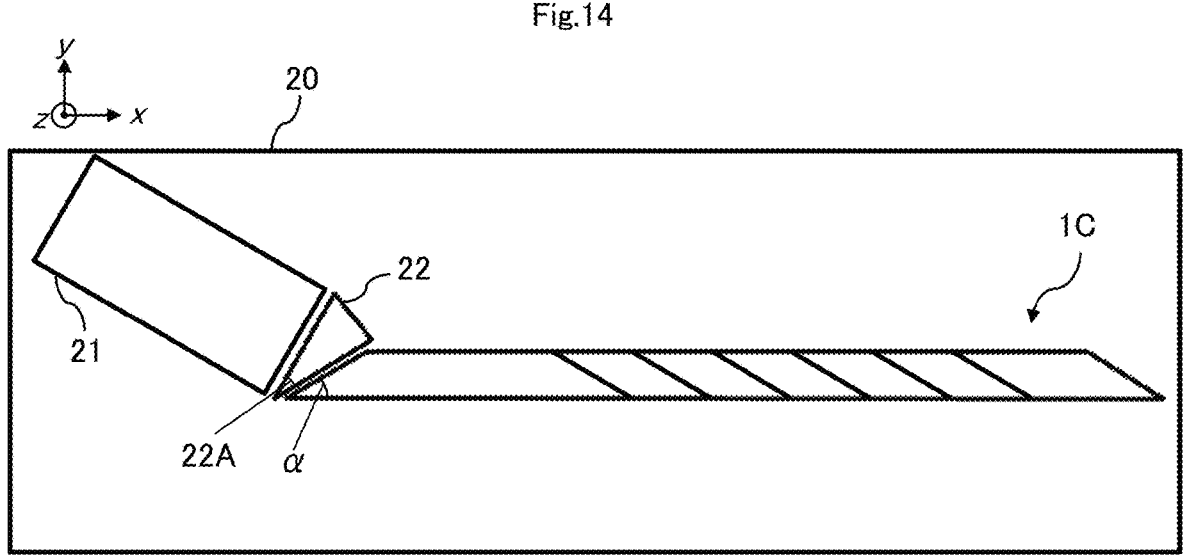
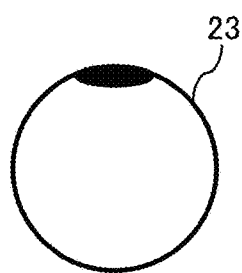

Fig.15A 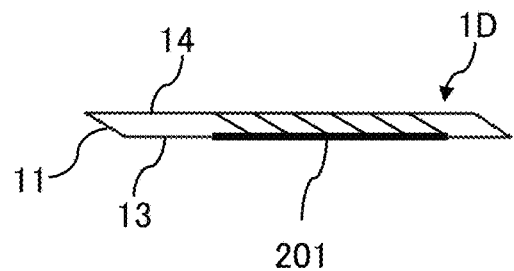 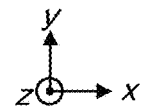
Fig.15B 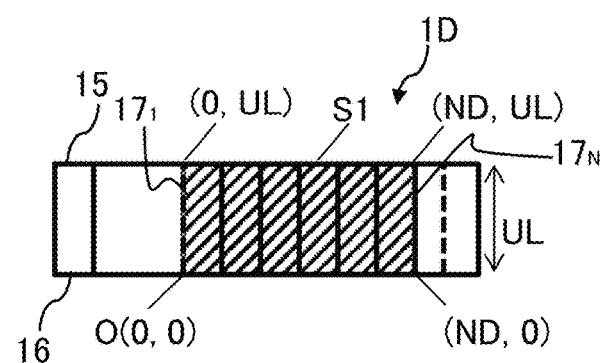 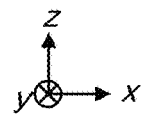
Fig.15C 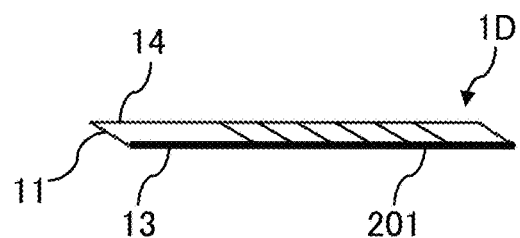 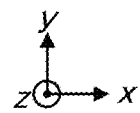
Fig.15D 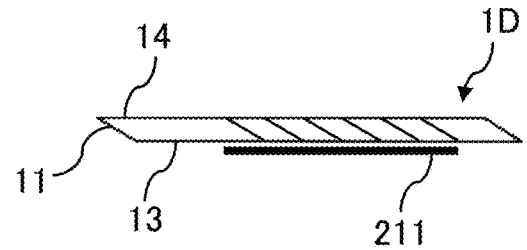 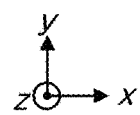

Fig.16A 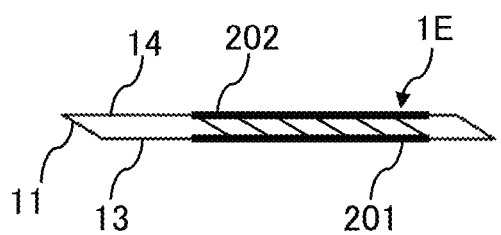 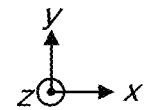
Fig.16B 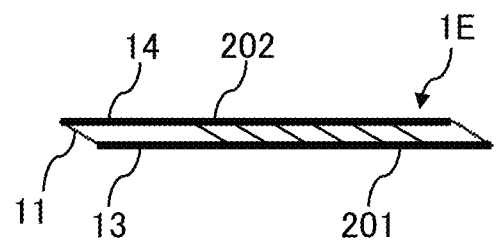 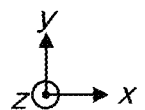
Fig.16C 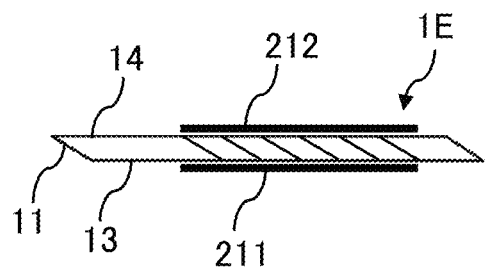 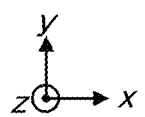

WAVEGUIDE AND VIDEO IMAGE DISPLAY DEVICE

TECHNICAL FIELD

The present invention relates to a waveguide and a video image display device. The present invention claims priority to Japanese Patent Application No. 2017-209393, filed on Oct. 30, 2017, the contents of which are incorporated by reference herein in its entirety in designated states where the incorporation of documents by reference is approved.

BACKGROUND ART

For example, PTL 1 discloses an optical device "including a substrate 20 that transmits light, an optical means for coupling light into the substrate by total internal reflection, and a plurality of partial reflection surfaces 22 included by the substrate, and the partial reflection surfaces are parallel to each other and are not parallel to any of edges of the substrate".

CITATION LIST

Patent Literature

PTL 1: United States Patent Application Publication No. 2003-0165017

SUMMARY OF INVENTION

Technical Problem

In the substrate (corresponding to a waveguide) described in Patent Literature 1, a reflectance of the plurality of partial reflection surfaces disposed inside the substrate is changed in order to secure uniformity of brightness of a video image. Thus, when a user sees the outside world (real space) via the substrate, the uniformity of the brightness of the outside world is impaired. Further, in this case, the substrate has shades of gray, and thus it is also not desirable in terms of design.

Furthermore, in the substrate described in Patent Literature 1, a reflectance of each of the partial reflection surfaces is set to be greatly different depending on an incident angle in order to prevent generation of a ghost video image different from an original video image desired to be displayed due to multiple reflection in the partial reflection surfaces inside the substrate. Thus, when the user sees the outside world via the substrate, the same color in the outside world may be seen as a different color depending on a direction in which the user sees, in other words, uniformity of color of the outside world may be impaired.

As described above, low uniformity of brightness and color of the outside world reduces realism when executing augmented reality (AR) that allows the user to see a video image being superimposed and displayed on the outside world seen via the substrate.

Still further, changing a reflectance of each of the partial reflection surfaces inside the substrate causes an increase in manufacturing step and cost.

The present invention has been made in view of such circumstances, and an object thereof is to achieve both uniformity of brightness and uniformity of color of the outside world seen via a waveguide and a video image reflected by a partial reflection surface inside the waveguide.

Solution to Problem

The present application includes a plurality of solutions to at least a part of the problems described above. One example of the solutions is as follows. In order to solve the above-described problem, a waveguide according to one aspect of the present invention includes an incident surface on which video image light is incident; first and second internal reflection surfaces that propagate the video image light incident from the incident surface while totally reflecting the video image light, and are substantially parallel to each other; and a plurality N of partial reflection surfaces that reflect a part of the video image light propagating by being totally reflected by the first and second internal reflection surfaces, output the part of the video image light as output light from the first internal reflection surface to the outside of the waveguide, and transmit the part of the video image light being incident, and are disposed in substantially parallel to each other inside the waveguide, wherein intensity Ik of output light reflected by a k-th (k is an integer of equal to or greater than 1 and equal to or less than (N−1)) partial reflection surface is equal to or greater than intensity I(k+1) of output light reflected by a (k+1)-th partial reflection surface disposed adjacent to the k-th partial reflection surface in a direction away from the incident surface.

Advantageous Effects of Invention

The present invention can achieve both uniformity of brightness and uniformity of color of the outside world seen via a waveguide and a video image reflected by a partial reflection surface inside the waveguide. Problems, configurations, and effects other than those described above are defined clearly in the following description of the embodiments.

BRIEF DESCRIPTION OF DRAWINGS

FIGS. 6A to 6D are diagrams for illustrating a reflectance of the partial reflection surface optimum for suppression of a ghost video image.

FIG. 8 is a diagram illustrating one example of a relationship between a reflectance of the plurality of partial reflection surfaces and a transmittance of natural light.

FIGS. 9A to 9C are diagrams illustrating a modification example of the first configuration example of the waveguide.

FIGS. 11A to 11C are diagrams illustrating a second configuration example of the waveguide.

FIGS. 12A to 12C are diagrams illustrating a third configuration example of the waveguide.

FIGS. 13A to 13C are diagrams illustrating a fourth configuration example of the waveguide.

FIG. 14 is a diagram illustrating one example of an arrangement of a video image generation unit corresponding to the fourth configuration example of the waveguide.

FIGS. 15A to 15D are diagrams illustrating a fifth configuration example of the waveguide.

FIGS. 16A to 16C are diagrams illustrating a sixth configuration example of the waveguide.

DESCRIPTION OF EMBODIMENTS

A plurality of embodiments according to the present invention will be described below with reference to the drawings. Note that, in all the drawings for illustrating each of the embodiments, the same members are basically denoted with the same reference symbols, and repeated description therefor is omitted. In the following embodiments, it is needless to say that the constituent elements (including element steps, and the like) are not necessarily essential unless otherwise particularly specified, obviously considered as essential in principle, or the like. It is needless to say that the expressions "being formed of A", "being constituted of A", "having A", and "including A" are not intended to eliminate other elements unless otherwise explicitly specifying to limit the particular element or the like. Similarly, in the following embodiments, when shapes of the constituent elements and the like, a positional relationship, and the like are referred to, shapes and the like that are substantially close to or similar to the shapes and the like are included unless otherwise particular specified, clearly considered to be exceptional in principle, or the like.

<With Regard to Configuration Example of Video Image Display Device Being First Embodiment According to Present Invention>

Figure 1:
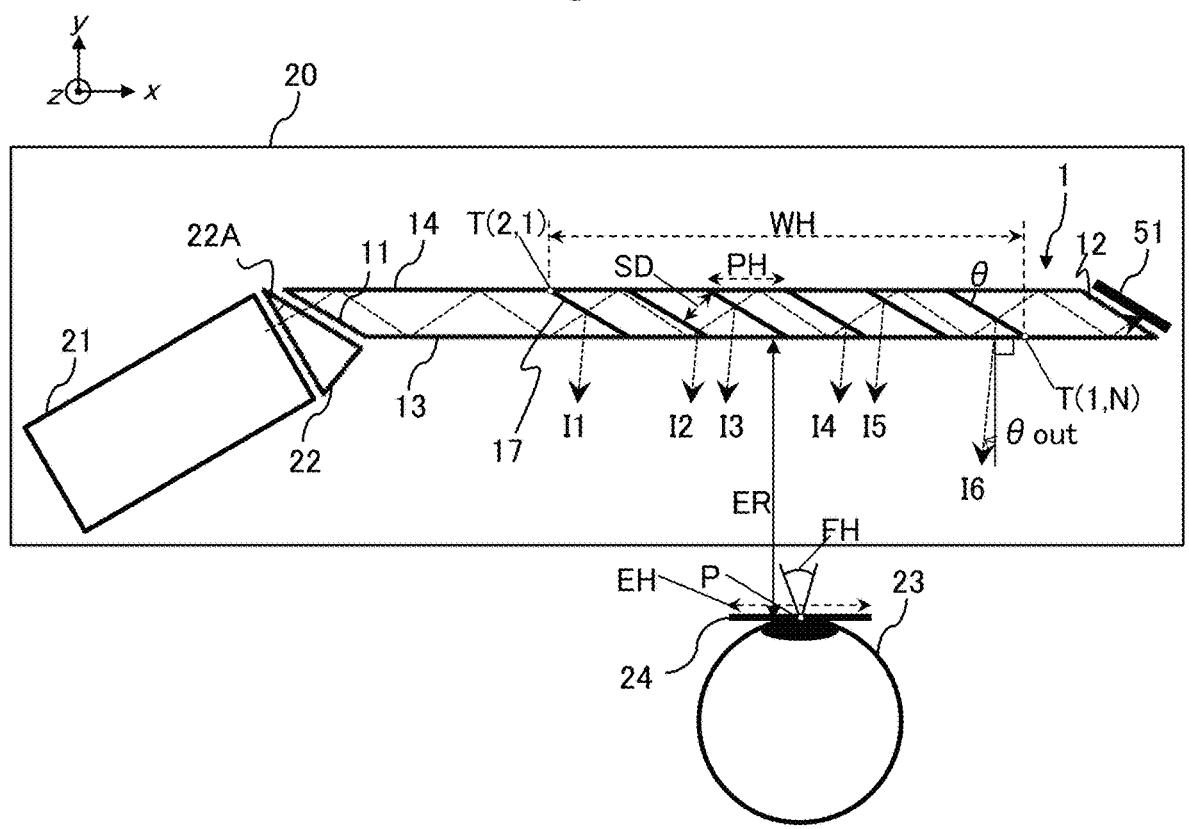
FIG. 1 is a diagram illustrating a configuration example of a video image display device being a first embodiment according to the present invention.

FIG. 1 illustrates a configuration example of a video image display device being a first embodiment according to the present invention. A video image display device 20 being the first embodiment includes a waveguide 1, a video image generation unit 21, and a coupling prism 22.

The waveguide 1 causes a user to visually recognize a video image by reflecting incident video image light toward the user. The video image generation unit 21 generates the video image light to be seen by the user, and emits the video image light to the coupling prism 22. The coupling prism 22 is configured to couple the video image generation unit 21 and the waveguide 1, and guides the video image light generated and emitted by the video image generation unit 21 to the waveguide 1. In other words, the coupling prism 22 includes a first surface and a second surface, and emits, from the second surface, the video image light from the video image generation unit 21 being incident on the first surface, to cause the video image light to be incident on an incident surface 11 of the waveguide 1.

Note that an opening having its surrounding being shielded may be provided in at least one of a portion between the video image generation unit 21 and the coupling prism 22 and a portion between the coupling prism 22 and the incident surface 11 of the waveguide 1. A size and a position of the opening are determined to shield the video image light output from the video image generation unit 21 to be incident on the coupling prism 22 from other than the first surface of the coupling prism 22, and shield the light emitted from the second surface of the coupling prism 22 to be incident on the waveguide 1 from other than the incident surface 11 of the waveguide 1. In this way, light unrelated to a video image entering an eye 23 of the user can be suppressed.

The waveguide 1 forms a housing of the waveguide 1, includes a first internal reflection surface 13 and a second internal reflection surface 14 substantially parallel to each other, and propagates the video image light incident on the incident surface 11 from the coupling prism 22 in an x direction by total reflection by the first internal reflection surface 13 and the second internal reflection surface 14. The waveguide 1 reflects a part of the video image light guided in the x direction by a plurality N of partial reflection surfaces 17 disposed inside the waveguide 1, to thereby changes a traveling direction, transmits the part of the video image light through the first internal reflection surface 13, and emits the part of the video image light to the outside of the waveguide 1. The part of the video image light emitted to the outside of the waveguide 1 is incident on the eye 23 of the user. In this way, the user can visually recognize a video image displayed by the video image display device 20 by perceiving the video image light incident on the eye 23.

A terminal surface 12 substantially parallel to the incident surface 11 is formed so as not to be orthogonal to the second internal reflection surface 14. The terminal surface 12 is preferably a polished surface instead of a sand surface (frosted glass surface). In this way, the video image light propagates through the inside of the waveguide 1 by the total reflection, and light transmitted through all of the plurality N of partial reflection surfaces 17 is easily transmitted through the terminal surface 12, and thus stray light is less likely to occur.

Note that a light shielding portion 51 formed of a light shielding wall, a light shielding block, a light shielding sheet, and the like for shielding light transmitted through the terminal surface 12 may be provided outside the terminal surface 12 of the waveguide 1. Stray light visually recognized by the user can be reduced by providing the light shielding portion 51. Furthermore, an air hole for releasing heat may be formed near the light shielding portion 51 in the video image display device 20 in order to prevent a rise in temperature inside the waveguide 1 due to energy of light absorbed by the light shielding portion 51.

<With Regard to Configuration Example of Video Image Generation Unit 21>

Figure 2:
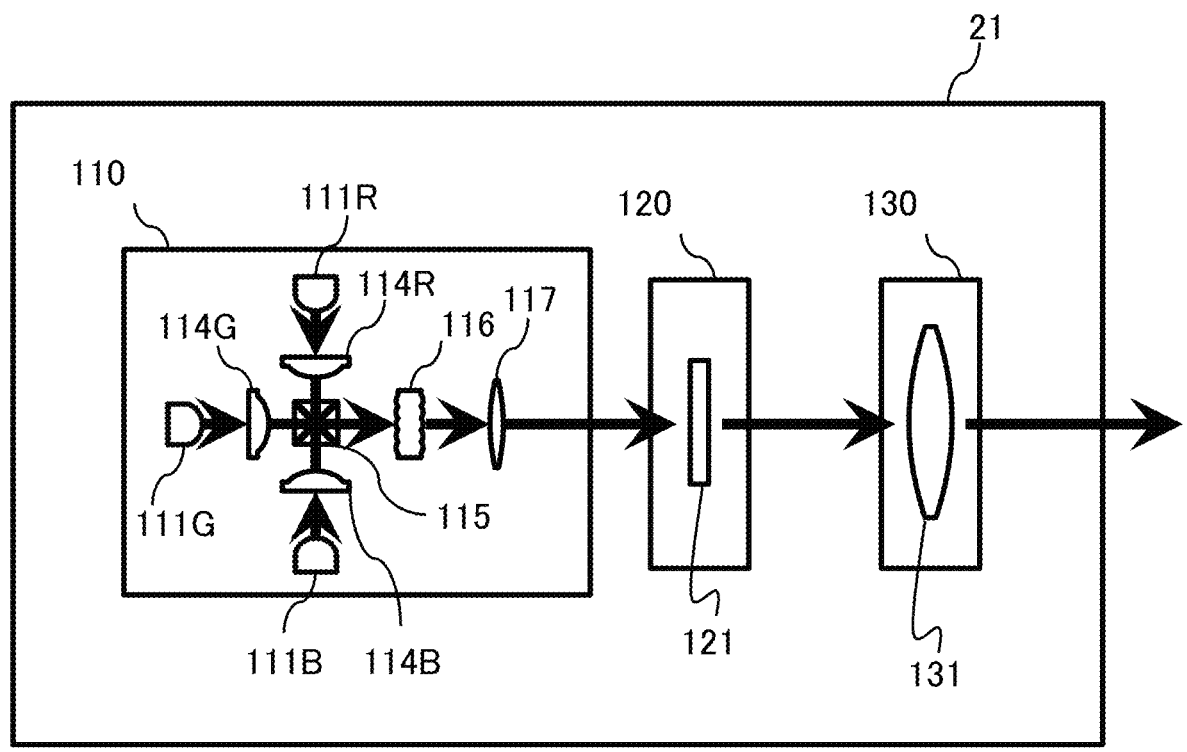
FIG. 2 is a block diagram illustrating a configuration example of a video image generation unit in FIG. 1.

Next, FIG. 2 illustrates a configuration example of the video image generation unit 21. The video image generation unit 21 includes a light source portion 110, a panel portion 120, and a projection optical portion 130.

The light source portion 110 emits light for the video image generation unit 21 to generate a video image, and causes the light to be incident on the panel portion 120.

The light source portion 110 includes, for example, a light source 111R and a condensing lens 114R for red, a light source 111G and a condensing lens 114G for green, a light source 111B and a condensing lens 114B for blue, a cross prism 115, a microlens array 116, and a lens 117.

The light source 111R emits red divergent light. The condensing lens 114R converges the divergent light from the light source 111R into substantially parallel light. The same also applies to the light sources 111G and 111B and the condensing lenses 114G and 114B.

Note that the condensing lenses 114R to 114B may each be formed of one lens or may each be formed of a plurality of lenses. The substantially parallel light beams emitted from the respective condensing lenses 114R, 114G, and 114B are incident on first to third surfaces of the cross prism 115, respectively, and emitted from a fourth surface of the cross prism 115. In other words, red, green, and blue light are combined by and emitted from the cross prism 115.

The light emitted from the cross prism 115 is transmitted through the microlens array 116 and the lens 117. The microlens array 116 and the lens 117 are designed and disposed such that an image of each incident cell of the microlens array 116 as an object is formed on a panel 121 of the panel portion 120, and a size of the formed image is substantially equal to a size of a region in which light is modulated in the panel 121. In this way, the light source portion 110 can illuminate the panel 121 of the panel portion 120 at a substantially uniform illumination distribution.

Note that the lens 117 may be formed of one lens or may be formed of a plurality of lenses.

The light source 111R, the light source 111G, and the light source 111B housed in separate packages may be adopted, and, for example, one package housing the light source 111R and the light source 111B and a package housing the light source 111G may be adopted. In this case, red, green, and blue light can be combined by using a dichroic mirror, for example.

One package housing the light source 111R, the light source 111G, and the light source 111B may be adopted. In this case, red, green, and blue light can be combined by using a light tunnel, an integrator, and the like, for example.

The panel portion 120 includes the panel 121 that displays a video image based on a video image signal, modulates the light incident from the light source portion 110 by the panel 121, and causes the light to be incident on the projection optical portion 130. As the panel 121, for example, a transmission-type or reflection-type liquid crystal panel and an element in which micro-electro mechanical systems (MEMS) with a mirror are arranged in an array can be adopted. A configuration of the video image generation unit 21 may be changed according to the panel 121 included in the panel portion 120.

The projection optical portion 130 includes a projection lens 131 formed of one or a plurality of lenses, and the projection lens 131 projects the light incident from the panel portion 120 onto a subsequent stage. In this way, the video image light is emitted from the video image generation unit 21 to the coupling prism 22.

It is preferable that a position of an exit pupil of the projection lens 131 is substantially equal to a position of a final surface (a surface farthest from the light source portion 110) of the projection lens 131, or is located on the waveguide 1 side with respect to a position of the final surface of the projection lens 131. Furthermore, it is desirable that a distance from the final surface of the projection lens 131 to the exit pupil of the projection lens 131 is substantially equal to an optical conversion distance in which a light beam transmitted on an axis of the projection lens 131 propagates through the inside of the waveguide 1 from the final surface of the projection lens 131 and reaches the eye 23 of the user.

In this way, the waveguide 1 can efficiently propagate the video image light generated by the video image generation unit 21 to the eye 23 of the user. A video image can be prevented from being missing caused by light of a part of a video image that does not reach the eye 23 of the user.

In the video image generation unit 21, the video image light is generated by driving the light source portion 110 and the panel portion 120 in synchronization with each other. Further, video image light of full color is generated by using the light source 111R, the light source 111G, and the light source 111B as the light source portion 110 and driving the light source portion 110 and the panel portion 120 by a field sequential method.

Note that the light source included in the light source portion 110 may emit light of color other than red, green, and blue. In this way, a color reproduction range displayable by the video image generation unit 21 can be increased. The displayable color reproduction range may be limited, and a light source that emits light of two kinds of colors and a light source that emits light of one kind of color may be provided. In this way, the video image generation unit 21 can be reduced in size and manufactured at a low cost.

<With Regard to First Configuration Example of Waveguide 1>

Figure 3A:
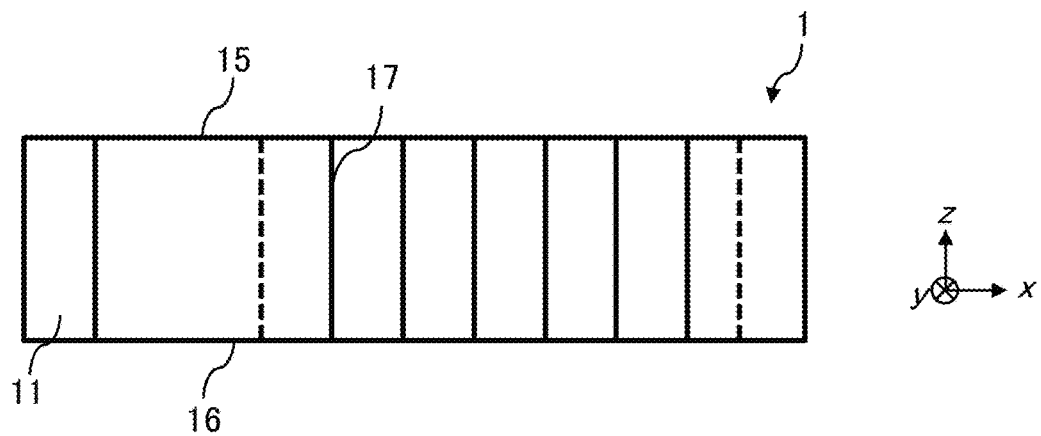
FIGS. 3A to 3C are diagrams illustrating a first configuration example of a waveguide in FIG. 1.
Figure 3B:
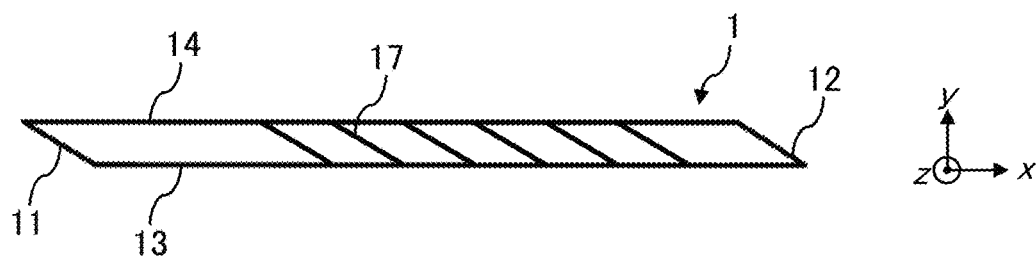
Figure 3C:

Next, FIGS. 3A to 3C illustrate a first configuration example of the waveguide 1. FIG. 3A is a front view of the waveguide 1. FIG. 3B is a plan view (a cross-sectional view in an xy plane) of the waveguide 1. FIG. 3C is a side view of the waveguide 1.

As illustrated in FIGS. 3A to 3C, an outer shape of the front of the waveguide 1 is a rectangle, an outer shape of the plane is a parallelogram, and an outer shape of the side is a rectangle. In other words, the outer shape of the waveguide 1 has a shape of a parallelepiped in which two surfaces facing each other in parallel with the xy plane are a parallelogram, and a total of four surfaces of two surfaces facing each other in parallel with an xz plane and two surfaces facing each other, being perpendicular to the xy plane, and making an acute angle with a yz plane is a rectangle.

Note that a rectangle with all four sides having an equal length is particularly referred to a square, but it is assumed that a rectangle includes a square in the description of the specification. For example, the outer shape of the front of the waveguide 1 is a rectangle as described above, which means that the outer shape of the front of the waveguide 1 may be a square.

The waveguide 1 of a parallelepiped includes six surfaces of the incident surface 11, the terminal surface 12, the first internal reflection surface 13, the second internal reflection surface 14, an upper surface 15, and a lower surface 16.

Of the six surfaces, the incident surface 11 and the terminal surface 12 are substantially parallel to each other, the first internal reflection surface 13 and the second internal reflection surface 14 are substantially parallel to each other, the upper surface 15 and the lower surface 16 are substantially parallel to each other.

As illustrated in FIG. 3B and the like, the plurality N (N=6 in the present embodiment) of partial reflection surfaces 17 are disposed inside the waveguide 1. The plurality N of partial reflection surfaces 17 are substantially parallel to each other. The plurality N of partial reflection surfaces 17 are substantially parallel to the incident surface 11. Hereinafter, of the plurality N of partial reflection surfaces 17, a first partial reflection surface $17_1$, a second partial reflection surface $17_2$, ..., and an N-th partial reflection surface $17_N$ are referred in order from a side closer to the incident surface 11.

The waveguide 1 is formed of a medium having high transparency, and the video image light incident on the incident surface 11 from the coupling prism 22 propagates through the medium inside the waveguide 1. As the medium of the waveguide 1, for example, a glass and a resin can be adopted. A refractive index of the medium preferably has a value such that the video image light incident from the incident surface 11 is totally reflected by the second internal reflection surface 14 by using a difference in refractive index. It is preferable that the medium of the waveguide 1 does not have birefringence or less birefringence in order to prevent multiple video image light beams from being displayed to form a ghost video image.

The first internal reflection surface 13 and the second internal reflection surface 14 of the waveguide 1 propagate the video image light incident from the incident surface 11 in the x direction through the inside of the waveguide 1 by total reflection. The video image light propagating in the x direction through the inside of the waveguide 1 is incident on the plurality N of partial reflection surfaces 17. Each of the partial reflection surfaces 17 reflects a part of the incident light to the first internal reflection surface 13 side. The first internal reflection surface 13 transmits the video image light reflected from the plurality N of partial reflection surfaces 17 and thus propagates the video image light to the outside of the waveguide 1, and also transmits the other light (external light incident via the second internal reflection surface 14).

The part of the light output to the outside of the waveguide 1 is incident on the eye 23 of the user. The user can visually recognize a video image displayed by the video image display device 20 by perceiving the light incident on the eye 23 of the user.

When the video image light incident from the incident surface 11 of the waveguide 1 is regularly reflected by the upper surface 15 or the lower surface 16 and is incident on the eye 23 of the user, the user may visually recognize the inverted video image light as stray light in addition to an original video image displayed by the video image display device 20. In order to suppress this, an interval between the upper surface 15 and the lower surface 16, i.e., a length in a z direction of the waveguide 1 is preferably set to a length such that the video image light incident from the incident surface 11 does not reach the upper surface 15 and the lower surface 16. The upper surface 15 and the lower surface 16 are preferably a sand surface that does not regularly reflect light.

The outer shape of the front of the waveguide 1 is preferably substantially equal to or greater than a minimum shape such that light reflected and scattered by reaching the upper surface 15 or the lower surface 16 passes through the outside of the eye 23 of the user or an eye box 24 (FIG. 1). Herein, the eye box 24 refers to a region of a predetermined size present in a position at a distance ER from the first internal reflection surface 13 and a region in which the user can visually recognize a video image displayed by the video image display device 20 when the eye 23 of the user is present in a range EH of the eye box 24. In this way, stray light unrelated to the video image visually recognized by the user can be reduced.

<With Regard to Configuration Example in which Light Shielding Portion is Added to First Configuration Example of Waveguide 1>

As a configuration for suppressing the video image light incident from the incident surface 11 of the waveguide 1 to be reflected or scattered by the upper surface 15 or the lower surface 16 and be incident on the eye 23 of the user, a light shielding portion(s) may be provided between the first internal reflection surface 13 and the eye 23 of the user.

Figure 4:
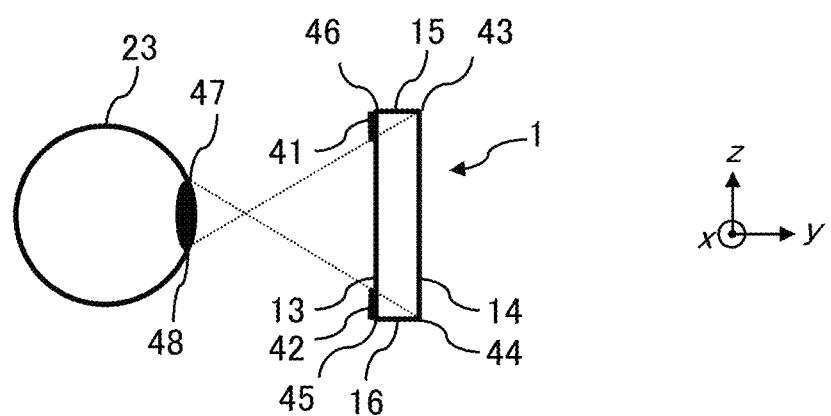
FIG. 4 is a diagram illustrating a configuration example in which light shielding portions are added to the first configuration example of the waveguide.

FIG. 4 illustrates a configuration example in which light shielding portions are added to the first configuration example of the waveguide 1. The light shielding portions 45 and 46 are formed of a light shielding wall, a light shielding block, a light shielding sheet, and the like that shield light acquired from the video image light incident from the incident surface 11 of the waveguide 1 being reflected or scattered by the upper surface 15 or the lower surface 16.

In FIG. 4, an intersection point of the upper surface 15 and the second internal reflection surface 14 is a point 43, an intersection point of the lower surface 16 and the second internal reflection surface 14 is a point 44, an intersection point of the lower surface 16 and the first internal reflection surface 13 is a point 45, an intersection point of the upper surface 15 and the first internal reflection surface 13 is a point 46, an upper end of a pupil of the eye 23 of the user is a point 47, and a lower end of the pupil of the eye 23 of the user is a point 48.

In this case, the light shielding portion 41 shields light at least from an intersection point of a line segment connecting the point 43 and the point 48 and the first internal reflection surface 13 to the point 46. The light shielding portion 42 shields light at least from an intersection point of a line segment connecting the point 44 and the point 47 and the first internal reflection surface 13 to the point 45. In this way, stray light visually recognized by the user can be further reduced.

Referring back to FIG. 1, the waveguide 1 is configured such that the user can visually recognize a video image of the video image light generated by the video image generation unit 21 in a predetermined direction. In other words, when an angle of an acute angle of angles formed between the first partial reflection surface $17_1$ and the second internal reflection surface 14 is θ, the angle θ has a value in a range of angles in which light in all traveling directions constituting a video image generated in the predetermined direction can be totally reflected inside the waveguide 1.

For example, in FIG. 1, it is assumed that an outgoing angle with a reference symbol from the waveguide 1 of light constituting a video image is θout, and a refractive index of a medium of the waveguide 1 is n. At this time, the angle θ with respect to θout of all light constituting a video image has a value in a range that satisfies the following formula (1).

$$n \times \sin(2\theta - \arcsin(\sin(\theta out)/n)) > 1 \quad (1)$$

<With Regard to Lattice Spacing of Plurality N of Partial Reflection Surfaces 17>

Next, a lattice spacing of the plurality N of partial reflection surfaces 17 will be described.

The lattice spacing of the plurality N of partial reflection surfaces 17 disposed inside the waveguide 1 may be regular intervals or may not be regular intervals. Herein, the lattice spacing refers to a length of a perpendicular line from a certain partial reflection surface 17 to another adjacent partial reflection surface 17.

Figure 5A:
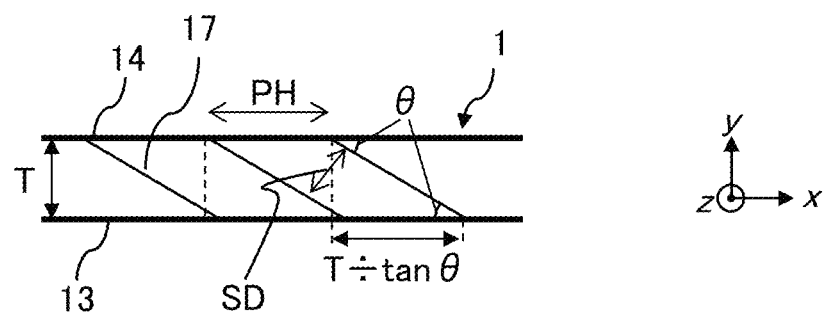
FIGS. 5A and 5B are a diagram for illustrating a lattice spacing of a plurality of partial reflection surfaces.
Figure 5B:
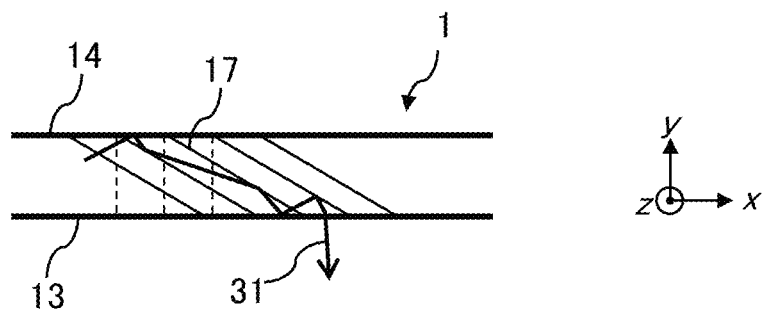

FIGS. 5A and 5B illustrate a condition of the lattice spacing of the plurality N of partial reflection surfaces 17. As illustrated in FIG. 5A, when an interval between the first internal reflection surface 13 and the second internal reflection surface 14 is T, a lattice spacing SD of the plurality N of partial reflection surfaces 17 desirably satisfies the following formula (2).

$$SD \leq T \times \cos\theta \quad (2)$$

In other words, an interval PH between intersection points of the plurality N of partial reflection surfaces 17 and the second internal reflection surface 14 desirably satisfies the following formula (3).

$$PH \leq T/\tan\theta \quad (3)$$

In this way, by providing the lattice spacing SD of the plurality N of partial reflection surfaces 17, projections of the respective partial reflection surfaces 17 overlap each other when the plurality N of partial reflection surfaces 17 are projected perpendicularly to the first internal reflection surface 13. In this way, the user can visually recognize a video image without being missing by the video image light from the video image generation unit 21.

Note that, even when the lattice spacing SD of the plurality N of partial reflection surfaces 17 satisfies the formula (2), the video image light incident on the waveguide 1 may be reflected by the plurality N of partial reflection surfaces 17 for a plurality of times in a manner of a light beam 31 as illustrated in FIG. 5B, and a proportion of the video image light emitted from the waveguide 1 may increase. In this way, resolution of a video image may decrease due to profile irregularity of the plurality N of partial reflection surfaces 17, and black floating may occur. In this case, a cost increases because the number of the partial reflection surfaces 17 increases. Therefore, the lattice spacing SD of the plurality N of partial reflection surfaces 17 also desirably satisfies the following formula (4).

$$SD \geq T \times \cos \theta/2 \quad (4)$$

Note that the lattice spacing of the plurality N of partial reflection surfaces 17 may be set as follows. Specifically, as illustrated in FIG. 1, it is assumed that the center of the pupil of the eye 23 of the user is a point P, and, with k being an integer of $1 \leq k \leq N$, an intersection point of a k-th partial reflection surface $17_k$ and the second internal reflection surface 14 is a point T(2, k), and an intersection point of the k-th partial reflection surface $17_k$ and the first internal reflection surface 13 is a point T(1, k). Then, in all integers k equal to or greater than 1 and equal to or less than N−1, it is desirable that the lattice spacing SD of the plurality N of partial reflection surfaces 17 is set such that the point T(1, k) is present on a side opposite to the incident surface 11 with respect to a straight line passing through the point P and a point T(2, k+1) or a point T(1, k) is substantially located on the straight line. The user can visually recognize a video image without being missing by the video image light from the video image generation unit 21 even by setting the lattice spacing SD in such a manner.

<With Regard to the Number N of Partial Reflection Surfaces 17 Disposed inside Waveguide 1>

Next, the number N of the partial reflection surfaces 17 disposed inside the waveguide 1 will be described.

As illustrated in FIG. 1, it is assumed that a distance between the point P of the center of the pupil of the eye 23 of the user and the first internal reflection surface 13 is ER (eye relief), a distance in the x direction in the xy plane between the point T(2, 1) and the point T(1, N) is WH, and a length in the x direction in the xy plane of the eye box 24 is EH. It is also assumed that a full width of an angle of view in the x direction in the xy plane of a size (angle of view) of a video image when the user sees the video image is FH.

In this case, the distance WH, the length EH, and the full width FH of the angle of view are as in the following formula (5).

$$WH \geq 2 \times ER \times \tan(FH/2) + EH \quad (5)$$

The number N of the partial reflection surfaces 17 is a value equal to or greater than N at minimum that satisfies the formula (5). Particularly, when the interval PH between the intersection points of the N partial reflection surfaces 17 and the second internal reflection surface 14=T/tan θ, WH=N× PH. Thus, the following formula (6) is derived from the formula (5).

$$N \geq \tan \theta / T \times (2 \times ER \times \tan(FH/2) + EH) \quad (6)$$

When a minimum integer that satisfies the formula (6) is Nmin, the waveguide 1 may include Nmin or more partial reflection surfaces 17. In other words, N Nmin.

In this way, the user can visually recognize a video image even when the eye 23 of the user is located in any position of the eye box 24.

Note that the lattice spacings SD of the N partial reflection surfaces 17 may be different from each other, but are preferably all equal. In this way, a kind of a base material to be prepared can be reduced in a process of manufacturing the waveguide 1 described later and the like, and a cost can be reduced.

A distance between the incident surface 11 and the first partial reflection surface $17_1$ and a distance between the N-th partial reflection surface $17_N$ and the terminal surface 12 may be different from each other, but are desirably equal. In this way, a kind of a base material to be prepared can be reduced in the process of manufacturing the waveguide 1 described later and the like, and a cost can be reduced.

<With Regard to Intensity of Reflected Light from Plurality N of Partial Reflection Surfaces 17>

Next, intensity of reflected light from the plurality N of partial reflection surfaces 17 will be described.

With k being an integer of equal to or greater than 1 and equal to or less than N, it is assumed that intensity of output light reflected by the k-th partial reflection surface $17_k$, transmitted through the first internal reflection surface 13, and output to the outside of the waveguide 1 is Ik. The waveguide 1 is set such that the intensity Ik of the output light reflected by the k-th partial reflection surface $17_k$ is greater than or substantially equal to intensity I(k+1) of output light reflected by a (k+1)-th partial reflection surface $17_{(k+1)}$ disposed on the terminal surface 12 side of the k-th partial reflection surface $17_k$ with respect to k equal to or greater than 1 and equal to or less than N−1.

In this way, luminance of a video image seen by the user is substantially uniform regardless of an angle of view or gradually changes. Thus, the user cannot recognize the change in luminance of the video image much, and uniformity of the luminance at an angle of view of the video image can be secured.

Luminance of the outside world seen by the user via the waveguide 1 is substantially uniform regardless of a direction or gradually changes. Thus, the user cannot recognize the change in luminance of the outside world much, and uniformity of the luminance of the outside world can be secured.

Furthermore, luminance of a video image and the outside world monotonously changes even when the eye 23 of the user moves in the eye box 24, and thus uniformity of the luminance in the eye box 24 can be secured, and a sense of discomfort that may be felt by the user can be reduced.

Still further, the waveguide 1 is set such that IN/I1 being a ratio between intensity of output light reflected by the N-th partial reflection surface $17_N$ on the terminal surface 12 side and intensity of output light reflected by the first partial reflection surface $17_1$ is equal to or greater than 0.5. In this way, the user can hardly recognize a luminance difference depending on an angle of view when the user sees a video image, and thus uniformity of the luminance at the angle of view of the video image can be improved. The user can hardly recognize a luminance difference depending on a direction when the user sees the outside world through the waveguide 1, and thus uniformity of the luminance of the outside world can be improved. Furthermore, the user can hardly recognize a change in luminance of a video image when the eye 23 of the user moves in the eye box 24, and thus a sense of discomfort can be less likely to be given to the user.

Note that the intensity ratio IN/I1 of the output light is desirably equal to or greater than 0.8, and is more desirably equal to or greater than 0.9.

Furthermore, all of the plurality N of partial reflection surfaces 17 desirably have a substantially equal reflectance. In a case where a reflectance of the plurality N of partial reflection surfaces 17 is changed, a design, mounting, and the like of a coating related to the reflectance of each of the partial reflection surfaces 17 need to change for each partial reflection surface 17. In contrast, when the N partial reflection surfaces 17 have a unified reflectance, a design, mounting, and the like of a coating need only one kind, and thus a design step and a manufacturing step can be reduced. Accordingly, a cost of the waveguide 1 can be suppressed.

For example, it is assumed that the N partial reflection surfaces 17 have a unified reflectance R, and the intensity ratio IN/I1 of the output light is equal to or greater than Ra. In this case, the intensity ratio IN/I1 of the output light is as in the following formula (7).

$$IN/I1 = (1-R)^{(N-1)} \quad (7)$$

Herein, when a reflectance R0 is defined as expressed in the following formula (8), the unified reflectance R of the N partial reflection surfaces 17 may be equal to or less than the reflectance R0.

$$R0 = 1 - Ra^{(1/(N-1))} \quad (8)$$

<With Regard to Polarized Light of Video Image Light to be Incident>

In general, when polarized light is defined with respect to an incident surface on which light is incident, P-polarized light has a reflectance lower than that of S-polarized light. Thus, a main component of polarized light of the video image light incident on the plurality N of partial reflection surfaces 17 of the waveguide 1 is preferably P-polarized light having a lower reflectance. In other words, a main component of polarized light of the video image light incident on the incident surface 11 of the waveguide 1 preferably has a polarization direction in the xy plane perpendicular to the incident surface 11, the first internal reflection surface 13, and the second internal reflection surface 14. In this way, the reflectance R of the N partial reflection surfaces 17 can be suppressed, and thus the number of films when implementing a reflectance of the internal reflection surface 13 by using a multilayer film coating can be reduced, and a cost can be suppressed.

As described above, the unified reflectance R of the N partial reflection surfaces 17 is equal to or less than R0, and thus a transmittance of natural light is increased. For this reason, a change in transmitting spectrum when an incident angle of natural light changes is reduced, and uniformity of color when the user sees the outside world via the waveguide 1 can also be secured.

The unified reflectance R of the N partial reflection surfaces 17 preferably has a lower wavelength dependency in a wavelength region of visible light. For example, when a ratio between a minimum reflectance and a maximum reflectance in a visible light region is equal to or greater than 50%, the user does not recognize nonuniformity of a video image and the outside world much. When the ratio is equal to or greater than 80%, the user can hardly recognize nonuniformity of a video image and the outside world. In this way, uniformity of color of a video image visually recognized by the user and uniformity of color of the outside world can be secured.

<With Regard to Ghost Video Image that May be Generated in Waveguide 1>

Next, a ghost video image that may be generated in the waveguide 1 will be described. In the waveguide 1 in which the plurality N of partial reflection surfaces 17 are disposed, a ghost video image being a video image different from an original video image desired to be seen by the user may be generated due to reflection by the partial reflection surface 17 for a plurality of times and emission from the waveguide 1.

FIGS. 6A to 6D are diagrams for illustrating generation of a ghost video image in the waveguide 1. As illustrated in FIG. 6A, in the waveguide 1, when light incident from the incident surface 11 is reflected by the partial reflection surface $17_k$ in a manner of a light beam 141, the light is transmitted through the first internal reflection surface 13 and emitted to the outside of the waveguide 1. However, with a reflection angle 143 being great when light is transmitted through the partial reflection surface $17_k$ and reflected by the partial reflection surface $17_{(k+1)}$ for the first time in a manner of a light beam 142, the light is also reflected by the partial reflection surface $17_{(k+1)}$, and the light may be emitted at an outgoing angle of the light beam 142 from the first internal reflection surface 13 different from an outgoing angle of the light beam 141 from the first internal reflection surface 13. This is visually recognized as a ghost video image by the user.

Next, a simulation result of a ghost video image will be described. FIG. 6B is one example of an image output as video image light by the video image generation unit 21. Note that an orientation of the image is as an illustrated coordinate axis. In other words, a vertically oriented image with a black lower half illustrated in FIG. 6B is displayed as a horizontally oriented video image with a black right half on the front of the waveguide 1 illustrated in FIG. 3A. All of the N partial reflection surfaces 17 of the waveguide 1 have the same reflectance R, and a video image visually recognized by the user is simulated while changing the reflectance R.

FIG. 6C illustrates a result of the above-described simulation. As illustrated in FIG. 6C, a video image is displayed on the waveguide 1 with increased luminance of a lower half that originally needs to be black (luminance is 0) as the reflectance R of the partial reflection surface 17 is increased due to generation of a ghost video image.

Herein, when a ghost video image luminance ratio is defined as (average of luminance of upper half of image in FIG. 6C that is not ghost video image)/(average of luminance of lower half of image in FIG. 6C that is ghost video image), it is clear that the ghost video image luminance ratio increases as the reflectance R of the partial reflection surface 17 increases.

FIG. 6D illustrates, by using a graph, a relationship between the reflectance R of the partial reflection surface 17 and the ghost video image luminance ratio, and a horizontal axis indicates the reflectance R and a vertical axis indicates the ghost video image luminance ratio.

Since the user visually recognizes a video image displayed on the waveguide 1 of the video image display device 20 to be superimposed on the outside world, it becomes dark such that relative brightness of a ghost video image with respect to brightness of the outside world cannot be substantially visually recognized when the ghost video image luminance ratio is equal to or less than 5%. Therefore, the reflectance R of the partial reflection surface 17 is preferably equal to or less than 25% such that the ghost video image luminance ratio is substantially equal to or less than 5%.

When the number of gray levels of a video image displayed by the video image display device 20 is, for example, 256 gray levels, a luminance ratio between a minimum gray level and a maximum gray level is 1/256=0.4%. Therefore, the reflectance is more preferably equal to or less than 2% such that the ghost video image luminance ratio is substantially equal to or less than 0.4%. In this way, the ghost video image luminance ratio can be suppressed to approximately equal to or less than the luminance ratio between the minimum gray level and the maximum gray level, and thus the user can be prevented from visually recognizing a ghost video image even in an environment in which the outside world is dark.

Note that, when the reflection angle 143 in FIG. 6A is greater than 80 degrees, the reflectance of the partial reflection surface 17 is more likely to be increased, and, when the reflection angle 143 is greater than 85 degrees, the reflectance is more likely to be increased or total reflection is more likely to occur in the partial reflection surface 17. Furthermore, when the reflection angle 143 is greater than 88 degrees, total reflection occurs in many cases. In this way, a ghost video image is more likely to be generated, and thus the reflection angle 143 may be set to equal to or less than 88 degrees, desirably equal to or less than 85 degrees, and more desirably equal to or less than 80 degrees with respect to all light beams incident from the incident surface 11.

<With Regard to Coupling Prism 22>

The coupling prism 22 is formed and disposed such that an angle of view of a video image generated by the video image generation unit 21 and an angle of view of a video image displayed by the video image display device 20 are substantially identical. For example, the coupling prism 22 is formed and disposed such that light incident perpendicularly to a first surface of the coupling prism 22 is emitted substantially perpendicularly from the first internal reflection surface 13. Specifically, for example, the coupling prism 22 is formed and disposed such that an angle formed between the first surface of the coupling prism 22 on which light from the video image generation unit 21 is incident and the second internal reflection surface 14 is substantially 2θ, in other words, the angle is substantially twice the angle θ of the angle formed between the first partial reflection surface 17₁ and the second internal reflection surface 14.

More specifically, the coupling prism 22 is formed and disposed such that the coupling prism 22 includes a vertex angle 22A being substantially the angle θ, and the second surface of the coupling prism 22 from which the video image light is emitted and the incident surface 11 are substantially parallel to each other.

The coupling prism 22 and the waveguide 1 may be formed of the same medium or a medium having a substantially equal refractive index. In this way, an incident angle of light incident on the coupling prism 22 and an outgoing angle of light emitted from the first internal reflection surface 13 can be substantially equal, and an angle of view of a video image generated by the video image generation unit 21 and an angle of view of a video image displayed by the video image display device 20 can be substantially identical.

Furthermore, the video image generation unit 21 and the coupling prism 22 are disposed such that a principal ray at the center of an angle of view of a video image generated by the video image generation unit 21 is incident substantially perpendicular to the coupling prism 22, and thus the principal ray at the center of the angle of view of the video image generated by the video image generation unit 21 can be emitted substantially perpendicularly from the first internal reflection surface 13.

Note that the principal ray at the center of the angle of view of the video image generated by the video image generation unit 21 may be emitted from the first internal reflection surface 13 of the waveguide 1 at an angle that is not perpendicular. This can be achieved by, for example, a configuration in which the principal ray at the center of the angle of view of the video image generated by the video image generation unit 21 is incident on the coupling prism 22 at an angle that is not perpendicular.

The coupling prism 22 may have an angle of the vertex angle 22A different from θ. In this case, an angle of view of a video image generated by the video image generation unit 21 and an angle of view of a video image displayed by the video image display device 20 can be made different from each other by an effect of beam compression or beam expansion. Furthermore, the coupling prism 22 may be omitted, and outgoing light of the video image generation unit 21 may be directly input to the incident surface 11 of the waveguide 1. In this way, the number of parts of the video image display device 20 can be reduced, and a reduction in cost, a reduction in mass, and a reduction in size can be achieved.

<With Regard to Specific Size of Waveguide 1>

Next, a specific size of the waveguide 1 will be described.

Figure 7:
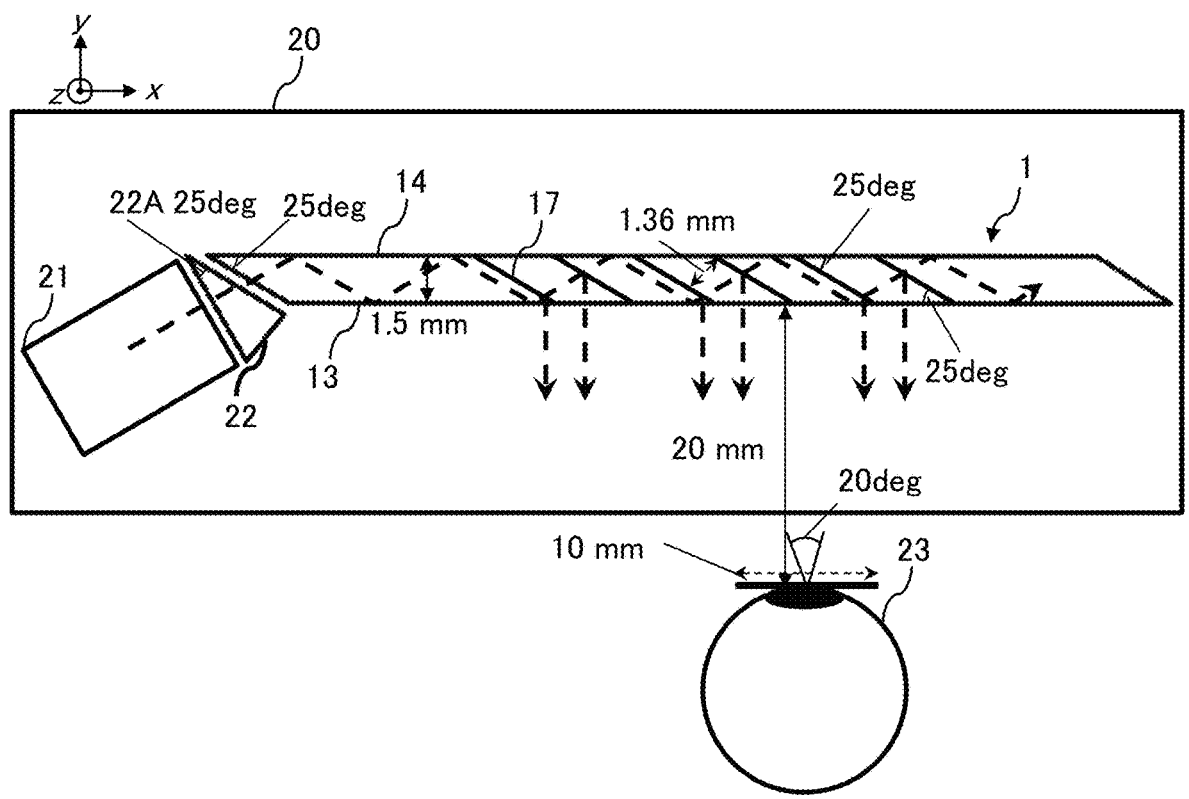
FIG. 7 is a diagram illustrating one example of a specific size in the first configuration example of the waveguide.

FIG. 7 describes one example of a specific size of each unit in the video image display device 20 illustrated in FIG. 1.

In a case of FIG. 7, the interval T between the first internal reflection surface 13 and the second internal reflection surface 14 is 1.5 mm, and the angle θ of the acute angle of angles formed between the partial reflection surface 17 and the first internal reflection surface 13 is 25 degrees.

With all lattice spacing SD of the N partial reflection surfaces 17 being 1.36 mm, the user can visually recognize a video image displayed by the video image display device 20 without missing the video image. The eye relief ER is 20 mm, the angle of view FH in the x direction in the xy plane of the video image displayed by the video image display device 20 is 20 degrees, and the length EH in the x direction in the xy plane of the eye box 24 is 10 mm. In this case, Nmin is 6 from the formula (5), and thus the user can visually recognize a video image with the eye 23 of the user located in any position of the eye box 24 by setting the number N of the partial reflection surfaces 17 to 6.

Next, FIG. 8 illustrates one example of a reflectance of the N(=6) partial reflection surfaces 17 disposed in the waveguide 1, intensity Ik of the video image light reflected by the k-th partial reflection surface $17_k$, and a transmittance of natural light of each surface.

In a case of FIG. 8, the intensity Ik of the video image light reflected by the k-th partial reflection surface $17_k$ is greater than intensity I(k+1) of the video image light reflected by the (k+1)-th partial reflection surface $17_{(k+1)}$ disposed on the terminal surface 12 side with respect to all integers k equal to or greater than 1 and equal to or less than (N−1). In this way, uniformity of luminance within an angle of view of a video image and uniformity of luminance of the outside world can be secured.

In a case of FIG. 8, the intensity ratio IN/I1 of the output light is equal to or greater than 0.5, and thus uniformity of luminance at an angle of view of a video image and uniformity of luminance of the outside world are extremely high. Furthermore, since the N partial reflection surfaces 17 have a unified reflectance of 12%, a design step and a manufacturing step can be reduced, and a cost can be suppressed.

Since the N partial reflection surfaces 17 have a unified reflectance of 12%, natural light also has a unified transmittance of a high value of 88%. Furthermore, in this case, a ghost video image luminance ratio is equal to or less than 3%, and thus a ghost video image can be suppressed to the extent to which the ghost video image cannot be visually recognized by the user when a video image displayed by the video image display device 20 is superimposed on the outside world and visually recognized.

In order to further reduce the ghost video image luminance ratio, for example, the N partial reflection surfaces 17 may all have a reflectance of 2%, and the ghost video image luminance ratio may be suppressed to approximately 0.4%. In this case, the intensity ratio IN/I1 of the output light is equal to or greater than 0.9, and thus uniformity of luminance at an angle of view of a video image and uniformity of luminance of the outside world can be further increased.

<With Regard to Method for Manufacturing Waveguide 1>

Next, a first manufacturing method of the waveguide 1 including the N partial reflection surfaces 17 will be described.

First, base materials that are N+1 plane plates are prepared. A thickness of a first base material is equal to a lattice spacing between the incident surface 11 and the first partial reflection surface $17_1$. With k being an integer of equal to or greater than 1 and equal to or less than N−1, a thickness of a (k+1)-th base material is equal to the lattice spacing SD between the k-th partial reflection surface $17_k$ and the (k+1)-th partial reflection surface $17_{(k+1)}$, and a thickness of a (N+1)-th base material is equal to a lattice spacing between the N-th partial reflection surface $17_N$ and the terminal surface 12. Note that it is assumed that two surfaces (hereinafter referred to as upper and lower surfaces) of the plane plates as the first to (N+1)-th base materials are each polished.

Next, a coating with a reflectance having a predetermined value is applied to one of the upper and lower surfaces of the first to N-th base materials. Next, an anti-reflection (AR) coating is applied to a surface of the upper and lower surfaces of the first base material without the coating, and one of the upper and lower surfaces of the (N+1)-th base material and the surface of the upper and lower surfaces of the N-th material to which the coating is applied are bonded together.

Next, with k being an integer of equal to or greater than 2 and equal to or less than N−1, a surface of upper and lower surfaces of a k-th base material with the coating and a surface of upper and lower surfaces of a (k+1)-th base material without the coating are bonded together. Furthermore, the surface of the upper and lower surfaces of the first base material to which the coating with the reflectance having the predetermined value is applied and a surface of the upper and lower surfaces of the second base material without the coating are bonded together.

Next, an optical part in which the first to (N+1)-th base materials are bonded is cut by a plurality of first cutting planes forming a predetermined angle with the upper and lower surfaces of the first base material and having a predetermined interval. By cutting by the plurality of first cutting planes, the first internal reflection surface 13 and the second internal reflection surface 14 of the waveguide 1 are formed.

Next, the optical part cut by the plurality of first cutting planes is cut by a plurality of first cutting planes being perpendicular to the upper and lower surfaces of the first base material, being perpendicular to the plurality of second cutting planes, and having a predetermined interval. By cutting by the plurality of second cutting planes, the upper surface 15 and the lower surface 16 of the waveguide 1 are formed.

Finally, of the optical part cut by the plurality of second cutting planes, the surface acquired by cutting by the plurality of first cutting planes is polished. The waveguide 1 is manufactured by the steps described above.

Note that the incident surface 11, the terminal surface 12, and the N partial reflection surfaces 17 are all substantially parallel to one another in the waveguide 1. Of six surfaces forming the outer shape of the waveguide 1, four surfaces of the first internal reflection surface 13, the second internal reflection surface 14, the upper surface 15, and the lower surface 16 are formed by cutting by the plurality of first cutting planes and cutting by the plurality of second cutting planes. The remaining incident surface 11 and terminal surface 12 correspond to the respective surfaces of the first base material and the (N+1)-th base material that are not bonded. Therefore, cutting, polishing, coating, and the like do not need to be performed in order to form the incident surface 11 and the terminal surface 12, and thus a manufacturing step can be reduced, and a cost can be suppressed.

Note that the coating with the reflectance having the predetermined value is applied to one of the upper and lower surfaces of the first to N-th base materials in the first manufacturing step described above, but, with k being an integer of equal to or greater than 1 and equal to or less than N, the k-th base material and the (k+1)-th base material may be bonded together with an adhesive without a gap, and the N partial reflection surfaces 17 may be formed by Fresnel reflection due to a difference in refractive index between the base material and the adhesive, instead of the application of the coating.

Alternatively, the k-th base material and the (k+1)-th base material may be bonded together with an air layer therebetween, and the N partial reflection surfaces 17 may be formed by Fresnel reflection due to a difference in refractive index between the base material and the air. Furthermore, the k-th base material and the (k+1)-th base material may have different refractive indexes by alternately using different media for the N base materials, and the N partial reflection surfaces 17 may be formed by Fresnel reflection due to a difference in refractive index between the base materials. Base materials may be bonded together by an optical contact that brings precisely polished base materials into intimate contact with each other without using an adhesive.

In the first manufacturing step described above, the waveguide 1 is formed by bonding the N+1 plane plates together, but a second manufacturing step described below may be adopted.

In the second manufacturing step, for example, N transparent base materials to which a coating having a predetermined reflectance is applied, a jig that can hold the N transparent base materials in parallel at a predetermined interval, and a predetermined mold having a cavity are prepared. Then, the N transparent base materials are fixed to a predetermined position inside the cavity of the predetermined mold by using the jig, and integral molding of pouring a melted optical medium into the predetermined mold, then solidifying the optical medium, cutting a predetermined surface, polishing the predetermined surface, and coating the predetermined surface is performed, thereby manufacturing the waveguide 1.

FIGS. 9A to 9C illustrate a configuration example of the waveguide 1 manufactured by the second manufacturing step described above. FIG. 9A is a front view of the waveguide 1. FIG. 9B is a plan view (a cross-sectional view in the xy plane) of the waveguide 1. FIG. 9C is a side view of the waveguide 1.

As is clear from FIG. 9B, in the waveguide 1 manufactured by the second manufacturing step, the N partial reflection surfaces 17 do not have an intersection point with the first internal reflection surface 13 and the second internal reflection surface 14.

According to the second manufacturing step, a waveguide having various outer shapes other than a parallelepiped, such as a waveguide 1A in FIGS. 11A to 11C and a waveguide 12A in FIGS. 12A to 12C that are described later, can be manufactured at a low cost.

Note that the first and second manufacturing steps described above are merely examples, and a step of a part thereof can be added, changed, omitted, and replaced.

<With Regard to Modification Example of Waveguide 1>

Figure 10A:
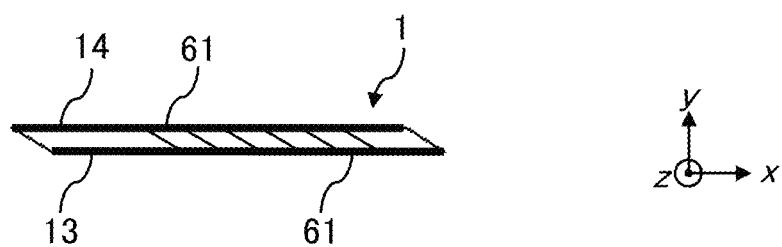
FIGS. 10A and 10B are diagrams illustrating a configuration example in which a protective portion is added to the first configuration example of the waveguide.
Figure 10B:
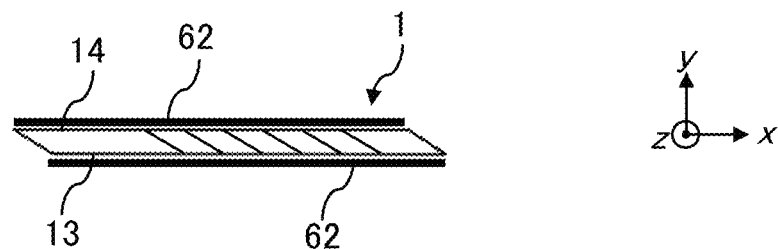

Next, FIGS. 10A and 10B illustrate, as a modification example of the waveguide 1, an example in which a protective portion for reinforcing rigidity of the waveguide 1 and suppressing generation of a scratch and the like is added.

In FIG. 10A, a protective portion 61 formed of a hard coating or an AR coating using a transparent medium is applied to the entire first internal reflection surface 13 and the entire second internal reflection surface 14. Note that the protective portion 61 may be applied to a part of the first internal reflection surface 13 and the second internal reflection surface 14.

In FIG. 10B, a protective portion 62 formed of a protective plate using a transparent medium is bonded to the entire first internal reflection surface 13 and the entire second internal reflection surface 14. Note that the protective portion 62 may be bonded to a part of the first internal reflection surface 13 and the second internal reflection surface 14.

The rigidity, weather resistance, and wear resistance of the first internal reflection surface 13 and the second internal reflection surface 14 can be improved by providing the protective portion 61 or 62 to the waveguide 1.

Note that chamfering such as C chamfering, R chamfering, and thread chamfering may be performed on a part or the whole of sides or vertexes of the waveguide 1. Breakage of the waveguide 1 can be prevented by performing chamfering.

According to the first configuration example of the waveguide 1 described above, uniformity of luminance and color of a video image and the outside world can be achieved at a low cost.

<With Regard to Second Configuration Example of Waveguide 1>

Next, FIGS. 11A to 11C illustrate a second configuration example of the waveguide 1. Hereinafter, the second configuration example of the waveguide 1 is referred to as a waveguide 1A.

FIG. 11A is a front view of the waveguide 1A. FIG. 11B is a plan view (a cross-sectional view in the xy plane) of the waveguide 1A. FIG. 11C is a side view of the waveguide 1A.

The waveguide 1A is different from the first configuration example (FIGS. 3A to 3C) of the waveguide 1 in that the terminal surface 12 and the incident surface 11 are not parallel to each other while the incident surface 11 and the plurality N of partial reflection surfaces 17 are substantially parallel to each other. A degree of freedom in shape (such as a design) of a waveguide can be increased by adopting the waveguide 1A.

The waveguide 1A can achieve uniformity of luminance and color of a video image and the outside world at a low cost.

<With Regard to Third Configuration Example of Waveguide 1>

Next, FIGS. 12A to 12C illustrate a third configuration example of the waveguide 1. Hereinafter, the third configuration example of the waveguide 1 is referred to as a waveguide 1B.

FIG. 12A is a front view of the waveguide 1B. FIG. 12B is a plan view (a cross-sectional view in the xy plane) of the waveguide 1B. FIG. 12C is a side view of the waveguide 1B.

As illustrated in FIG. 12A, the waveguide 1B is different from the first configuration example (FIGS. 3A to 3C) of the waveguide 1 in that an outer shape of the front of the waveguide 1B is an octagon.

The outer shape of the front of the waveguide 1B preferably has a size equal to or greater than a minimum shape such that a track of a light beam incident from the incident surface 11 does not have an intersection point with the outer shape of the front of the waveguide 1B or, even when the track has the intersection point, light reflected or scattered at the intersection point passes through the outside of the eye 23 of the user or the eye box 24. In this way, the waveguide 1B can reduce stray light unrelated to a video image visually recognized by the user.

Note that the outer shape of the front of the waveguide 1B illustrated in FIGS. 12A to 12C is an octagon, but the shape may be, for example, a shape of a polygon, a shape of an ellipse, a shape of a closed free curve, a closed shape that combines a straight line and a curved line, and the like.

By adopting the waveguide 1B, uniformity of luminance and color of a video image and the outside world can be achieved at a low cost, and a degree of freedom in shape (such as a design) of a waveguide can also be increased.

<With Regard to Fourth Configuration Example of Waveguide 1>

Next, FIGS. 13A to 13C illustrate a fourth configuration example of the waveguide 1. Hereinafter, the fourth configuration example of the waveguide 1 is referred to as a waveguide 1C.

FIG. 13A is a front view of the waveguide 1C. FIG. 13B is a plan view (a cross-sectional view in the xy plane) of the waveguide 1C. FIG. 13C is a side view of the waveguide 1C.

As illustrated in FIG. 13B, the waveguide 1C is different from the first configuration example (FIGS. 3A to 3C) of the waveguide 1 in that the incident surface 11 is not substantially parallel to the plurality N of partial reflection surfaces 17 and the terminal surface 12.

<With Regard to One Example of Arrangement of Video Image Generation Unit 21 When Waveguide 1C is Adopted>

FIG. 14 illustrates one example of an arrangement of the video image generation unit 21 in the video image display device 20 that adopts the waveguide 1C.

When the waveguide 1C is adopted in the video image display device 20, the arrangement of the video image generation unit 21 and the coupling prism 22 can be changed from the arrangement illustrated in FIG. 1. In this way, a degree of freedom in the arrangement of the video image generation unit 21 and the coupling prism 22 can be improved. Specifically, as illustrated in FIGS. 13A to 14, by setting an angle α formed between the incident surface 11 and the second internal reflection surface 14 to an acute angle, the video image generation unit 21 and the coupling prism 22 can be moved in a direction away from the eye 23 of the user.

Note that an outer shape of the waveguide 1C is not limited to the example in FIGS. 13A to 13C, and the incident surface 11 and the plurality N of partial reflection surfaces 17 may not be parallel to each other and an angle α formed between the incident surface 11 and the first internal reflection surface 13 may be an obtuse angle.

By adopting the waveguide 1C, uniformity of luminance and color of a video image and the outside world can be achieved at a low cost, and a degree of freedom in shape (such as a design) of the video image display device 20 can also be increased.

<With Regard to Fifth Configuration Example of Waveguide 1>

Next, FIGS. 15A to 15D illustrate a fifth configuration example of the waveguide 1. Hereinafter, the fifth configuration example of the waveguide 1 is referred to as a waveguide 1D.

FIG. 15A illustrates a plan view (a cross-sectional view in the xy plane) of the waveguide 1D. FIG. 15B illustrates a front view of the waveguide 1D. FIG. 15C illustrates a plan view of a modification example of the waveguide 1D. FIG. 15D illustrates a plan view of another modification example of the waveguide 1D.

The waveguide 1D is different from the first configuration example (FIGS. 3A to 3C) of the waveguide 1 in that a coating portion 201 (corresponding to a first coating portion of the present invention) having a transmittance distribution that substantially uniformizes brightness of a video image is applied to a part of the first internal reflection surface 13.

In the front view illustrated in FIG. 15B, a point where a line segment acquired by perpendicularly projecting a line segment where the first partial reflection surface 17$_1$ and the second internal reflection surface 14 cross each other to the first internal reflection surface 13, and the lower surface 16 cross each other is an origin O (0, 0), coordinates of a point where the N-th partial reflection surface 17$_N$ and the lower surface 16 cross each other are (ND, 0), and a distance between the upper surface 15 and the lower surface 16 is UL.

A region of the first internal reflection surface 13 in which the coating portion 201 is applied is preferably a region including at least a region in which all of the partial reflection surfaces 17$_1$ to 17$_N$ are projected perpendicularly to the first internal reflection surface 13. In other words, the region of the first internal reflection surface 13 in which the coating portion 201 is applied is preferably a region including at least a region S1 in which 0≤x≤ND and 0≤y≤UL as illustrated in FIG. 15B.

The coating portion 201 has a transmittance distribution in which an intensity distribution of light being incident from the incident surface 11, reflected by the N partial reflection surfaces 17, transmitted through the first internal reflection surface 13, and output to the outside of the waveguide 1D is substantially uniform.

For example, it is assumed that the N partial reflection surfaces 17 included in the waveguide 1D have the unified reflectance R. When x and y are set to 0≤x≤ND and 0≤y≤UL, a transmittance f of the coating portion 201 in a position in which coordinates on the front view of the waveguide 1D are (x, y) is as in the following formula (9).

$$f = x/ND \times (1-(1-R)^{(N-1)}) + (1-R)^{(N-1)} \quad (9)$$

In this way, the intensity distribution of the light output to the outside of the waveguide 1D can be substantially uniform. The transmittance distribution of the coating portion 201 is a linear function related to x and does not depend on y, and can thus be achieved by coating with a low degree of difficulty.

Note that the transmittance f of the coating portion 201 may be changed exponentially in an x-axis direction as expressed in the following formula (10).

$$f = (1-R)^{((1-x/ND) \times (N-1))} \quad (10)$$

In this way, a degree of uniformity of the intensity of the light output to the outside of the waveguide 1D can be further improved.

Note that the coating portion 201 applied to the first internal reflection surface 13 of the waveguide 1D may be applied to the entire surface of the first internal reflection surface 13 as illustrated in FIG. 15C, instead of being applied to a part of the first internal reflection surface 13.

Note that it is preferable that the transmittance f of the coating portion 201 in which x<0 when the coating portion 201 is applied to the entire surface of the first internal reflection surface 13 is substantially equal to the transmittance f in which x=0, or the transmittance f in which x=0 continuously changes. Furthermore, it is preferable that the transmittance f of the coating portion 201 in which ND<x is substantially equal to the transmittance f in which x=ND, or the transmittance f in which x=ND continuously changes. In this way, a transmittance of natural light continuously changes when the user sees the outside world via the waveguide 1D, and thus the user can be less likely to feel a sense of discomfort.

Note that the transmittance f of the coating portion 201 in which x<0 and ND<x may be substantially 100%. In this way, the transmittance of the natural light transmitted through a region of the coating portion 201 in which x<0 and ND<x is increased when the user sees the outside world via the waveguide 1D, and thus see-through properties of the waveguide 1D can be improved.

Note that, as illustrated in FIG. 15D, a transparent plate 211 having a transmittance distribution that substantially uniformizes brightness of a video image may be disposed between the first internal reflection surface 13 and the eye 23 of the user instead of applying the coating portion 201 to the first internal reflection surface 13. The transparent plate 211 may be disposed to cover a part of the first internal reflection surface 13 or the entire surface thereof, similarly to the coating portion 201.

The waveguide 1D can improve the see-through properties, and can also improve uniformity of a video image and the outside world when changing a direction in which the user sees.

<With Regard to Sixth Configuration Example of Waveguide 1>

Next, FIGS. 16A to 16C illustrate a sixth configuration example of the waveguide 1. Hereinafter, the sixth configuration example of the waveguide 1 is referred to as a waveguide 1E.

FIG. 16A is a plan view (a cross-sectional view in the xy plane) of the waveguide 1E. FIG. 16B is a plan view of a modification example of the waveguide 1E. FIG. 16C is a plan view of another modification example of the waveguide 1E.

The waveguide 1E includes a coating portion 202 (corresponding to a second coating portion of the present invention) added to a part of the second internal reflection surface 14 in the waveguide 1D (FIGS. 15A to 15D).

A region of the coating portion 202 applied to a part of the second internal reflection surface 14 is preferably a region including at least a region in which all of the partial reflection surfaces $17_1$ to $17_N$ are projected perpendicularly to the second internal reflection surface 14. In other words, when coordinates are defined similarly to those in FIG. 15B, the region of the coating portion 202 is preferably a region of the second internal reflection surface 14 including at least a region in which 0≤x≤ND and 0≤y≤UL. Note that the coating portion 202 has a transmittance distribution in which an intensity distribution of light being emitted from the first internal reflection surface 13 is substantially uniform when light of a uniform intensity distribution is incident from the outside of the second internal reflection surface 14.

For example, it is assumed that the N partial reflection surfaces 17 disposed on the waveguide 1E has the unified reflectance R, and, with k being an integer of 1≤k≤N−1, the k-th partial reflection surface $17_k$ and the (k+1)-th partial reflection surface $17_{(k+1)}$ are disposed substantially without overlapping and a gap when the N partial reflection surfaces 17 are projected perpendicularly to the second internal reflection surface 14. It is assumed that, when x and y are set to 0≤x≤ND and 0≤y≤UL, a transmittance f of the coating portion 201 in a position in which coordinates the waveguide 1E on the front view of are (x, y) is f(x, y). At this time, the transmittance of the coating portion 202 in the position in which the coordinates of the waveguide 1E on the front view are substantially equal to g/f(x, y) using a constant g. In this way, a transmittance of natural light is substantially uniform when the user sees the outside world via the waveguide 1E, and thus see-through properties can be improved.

Note that the coating portion 202 applied to the second internal reflection surface 14 of the waveguide 1E may be applied to the entire surface of the second internal reflection surface 14 as illustrated in FIG. 16B, instead of being applied to a part of the second internal reflection surface 14. Also, in this case, the transmittance of the natural light can be substantially uniform when the user sees the outside world via the waveguide 1E, and thus the see-through properties can be improved.

Note that, as illustrated in FIG. 16C, a transparent plate 212 having a transmittance distribution that can substantially uniformize a transmittance of natural light may be disposed outside the second internal reflection surface 14 instead of applying the coating portion 202 to the second internal reflection surface 14. Note that the transparent plate 212 may be disposed to cover a part of the second internal reflection surface 14 or the entire surface thereof, similarly to the transparent plate 211 in the waveguide 1D.

The waveguide 1E can improve the see-through properties, and can also improve uniformity of a video image and the outside world when changing a direction in which the user sees.

<With Regard to Configuration Example of Video Image Display Device Being Second Embodiment According to Present Invention>

Figure 17:
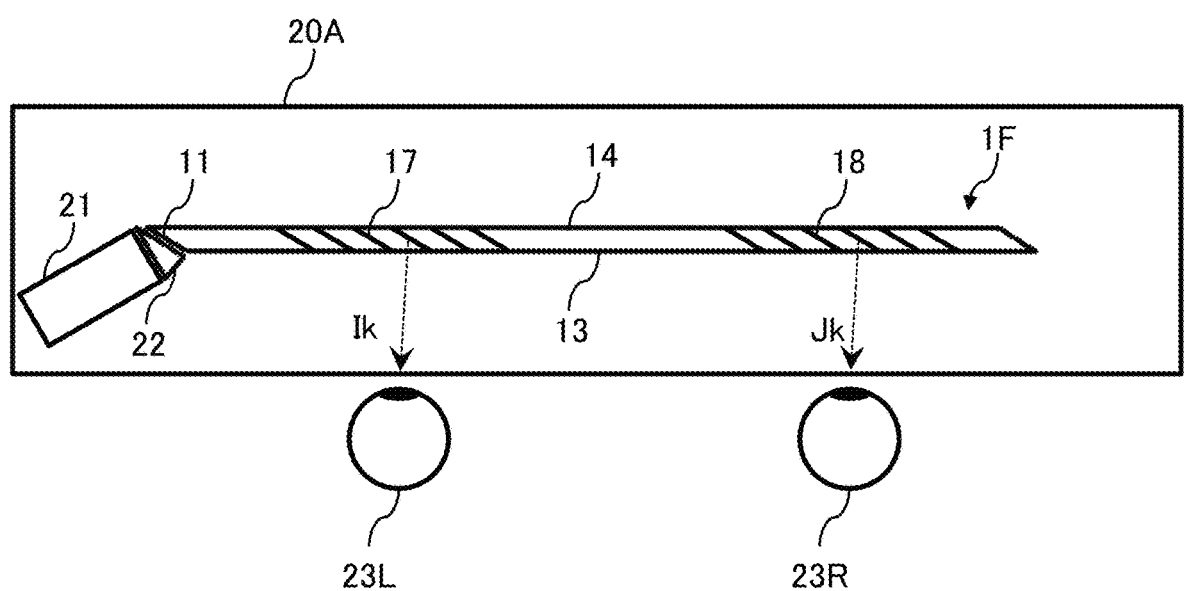
FIG. 17 is a diagram illustrating a configuration example of a video image display device being a second embodiment according to the present invention.

Next, FIG. 17 illustrates a configuration example of a video image display device being a second embodiment according to the present invention. The video image display device 20 being the first embodiment described above is configured such that a video image can be seen with one eye 23 of the user. A video image display device 20A being the second embodiment is configured such that a video image can be seen with a left eye 23L and a right eye 23R of the user.

The video image display device 20A being the second embodiment includes a waveguide 1F that replaces the waveguide 1 in the video image display device 20. The other constituent elements are denoted with the same reference symbols as those of the video image display device 20, and description therefor is omitted.

The waveguide 1F has a configuration in which a plurality M of partial reflection surfaces 18 are added to the waveguide 1 in which the plurality N of partial reflection surfaces 17 are disposed in the video image display device 20. Herein, M is an integer of 2 or more. Further, M may be equal to or different from N.

The plurality M of partial reflection surfaces 18 are substantially parallel to each other, and are also substantially parallel to the N partial reflection surfaces 17. Hereinafter, of the plurality M of partial reflection surfaces 18, a first partial reflection surface $18_1$, a second partial reflection surface $18_2$, . . . , and an M-th partial reflection surface $18m$ are referred in order from a side closer to the incident surface 11.

In the waveguide 1F, light incident from the incident surface 11 and transmitted through all of the N partial reflection surfaces 17 propagates while being totally reflected inside the waveguide 1F, and is incident on the plurality M of partial reflection surfaces 18. The plurality M of partial reflection surfaces 18 are each configured to reflect a part of the incident light and transmit the light through the first internal reflection surface 13, and thus cause propagating of the light to the outside of the waveguide 1F and transmitting of the other light.

Each part of the light output to the outside of the waveguide 1F from the N partial reflection surfaces 17 is incident on the left eye 23L of the user. Each part of the light output to the outside of the waveguide 1F from the plurality M of partial reflection surfaces 18 is incident on the right eye 23R of the user. In this way, the user can visually recognize a video image displayed by the video image display device 20A by perceiving the light incident on the left eye 23L and the right eye 23R.

Intensity of light output from the waveguide 1F will be described. Herein, with k being an integer of equal to or greater than 1 and equal to or less than N, it is assumed that intensity of output light reflected by the k-th partial reflection surface $17_k$, transmitted through the first internal reflection surface 13, and output to the outside of the waveguide 1F is Ik. With k being an integer of equal to or greater than 1 and equal to or less than M, it is assumed that intensity of output light reflected by a k-th partial reflection surface $18_k$, transmitted through the first internal reflection surface 13, and output to the outside of the waveguide 1F is Jk.

At this time, the intensity Ik of the output light is greater than or substantially equal to intensity I(k+1). The intensity Jk of the output light is greater than or substantially equal to intensity J(k+1). In this way, uniformity of luminance of a video image and the outside world can be secured.

Note that it is preferably configured such that the intensity I1 and the intensity J1 are substantially equal and intensity IN and intensity JM are substantially equal. In this way, when the user visually recognizes a video image displayed by the video image display device 20A, brightness of a video image perceived by each of the left eye 23L and the right eye 23R of the user is substantially the same, and the user is less likely to feel a sense of discomfort.

Note that JM/I1 being a ratio between the intensity JM of light reflected by the M-th partial reflection surface $18m$ and the intensity I1 of light reflected by the first partial reflection surface $17_1$ is preferably equal to or greater than 0.5. In other words, when a ratio of brightness of a video image perceived by the right eye 23R of the user and brightness of a video image perceived by the left eye 23L of the user is equal to or greater than 0.5, the user can hardly recognize a difference in the brightness, and thus the user can be less likely to feel a sense of discomfort.

All of the N partial reflection surfaces 17 and the plurality M of partial reflection surfaces 18 preferably have substantially the same reflectance. In this way, a design step and a manufacturing step of the waveguide 1F can be reduced, and thus a cost can be suppressed.

As a modification example of the waveguide 1F, the waveguide 1F may be divided into a first waveguide 1F1 including the N partial reflection surfaces 17 and a second waveguide 1F2 including the plurality M of partial reflection surfaces 18, and a coupling prism may be provided between the first waveguide 1F1 and the second waveguide 1F2. The coupling prism is formed and disposed such that at least a part of light transmitted through the first waveguide 1F1 is incident on the second waveguide 1F2.

Note that, in the description described above, a part of the light reflected by the N partial reflection surfaces 17 and output to the outside of the waveguide 1F is incident on the left eye 23L of the user, and a part of the light reflected by the plurality M of partial reflection surfaces 18 and output to the outside of the waveguide 1F is incident on the right eye 23R of the user in the video image display device 20A. On the contrary, the video image display device 20A may be configured such that a part of the light reflected by the N partial reflection surfaces 17 and output to the outside of the waveguide 1F is incident on the right eye 23R of the user, and a part of the light reflected by the plurality M of partial reflection surfaces 18 and output to the outside of the waveguide 1F is incident on the left eye 23L of the user.

According to the video image display device 20A, the user can perceive the same light with the left eye 23L and the right eye 23R, and can visually recognize the same video image displayed by the video image display device 20A.

Note that the video image display device 20A can be manufactured in a relatively small size at a low cost.

<With Regard to Configuration Example of Video Image Display Device Being Third Embodiment According to Present Invention>

Figure 18:
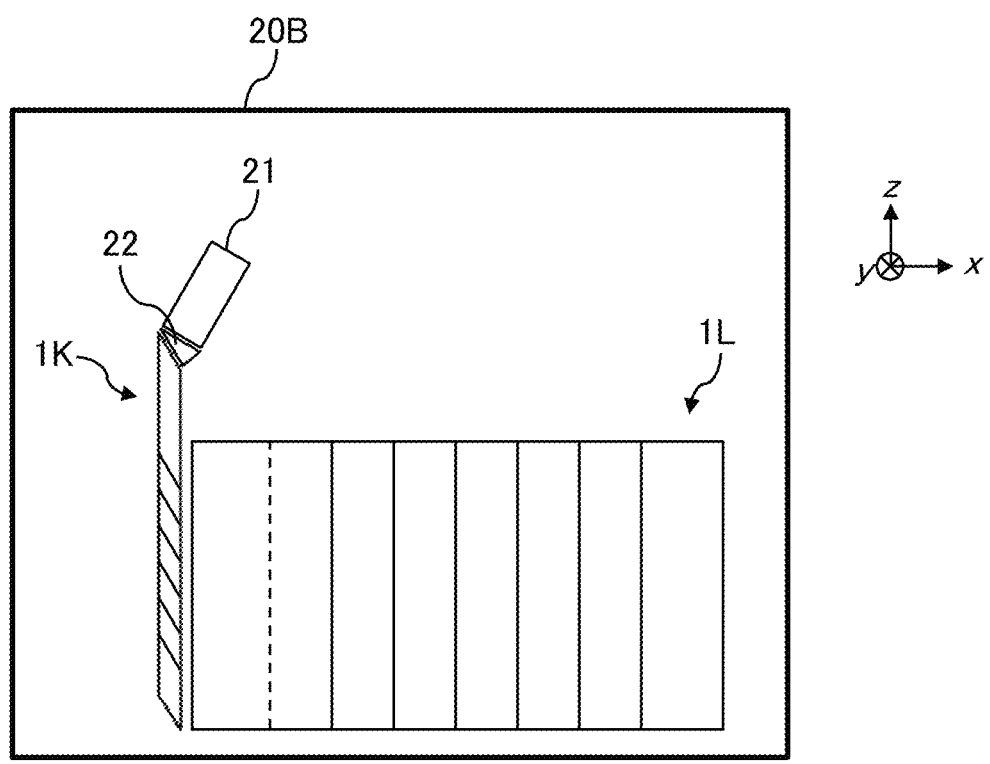
FIG. 18 is a diagram illustrating a configuration example of a video image display device being a third embodiment according to the present invention.

Next, FIG. 18 illustrates a configuration example of a video image display device being a third embodiment according to the present invention.

A video image display device 20B being the third embodiment according to the present invention includes a waveguide 1K and a waveguide 1L that replace the waveguide 1 in the video image display device 20. The other constituent elements are denoted with the same reference symbols as those of the video image display device 20, and description therefor is omitted.

Figure 19A:
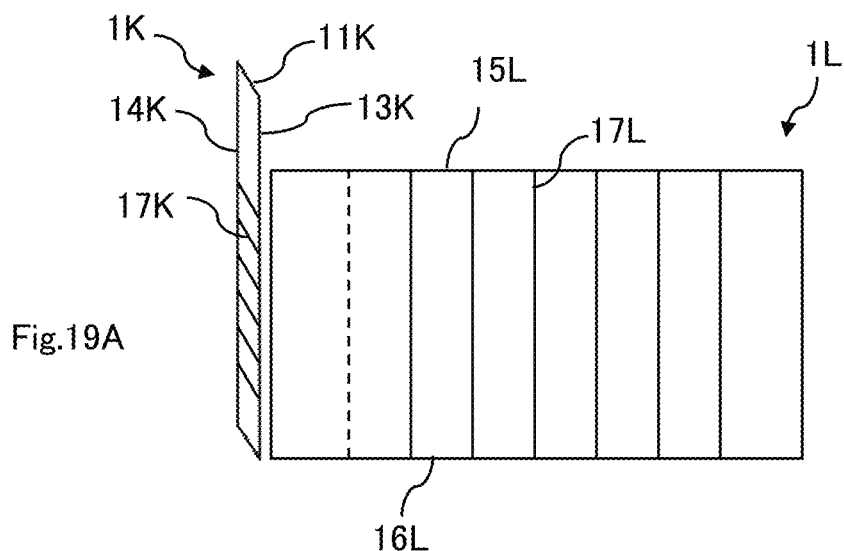
FIGS. 19A to 19C are diagrams illustrating a configuration example of first and second waveguides in FIG. 18.
Figure 19B:
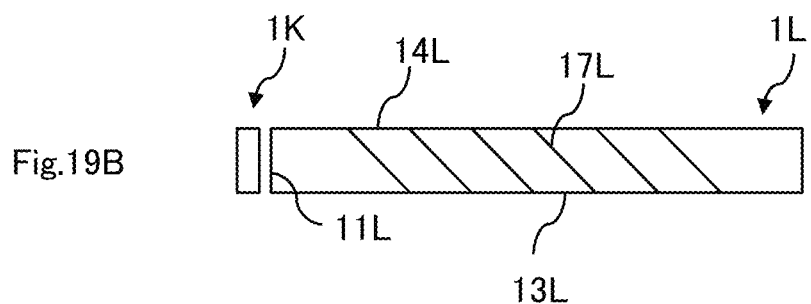
Figure 19C:
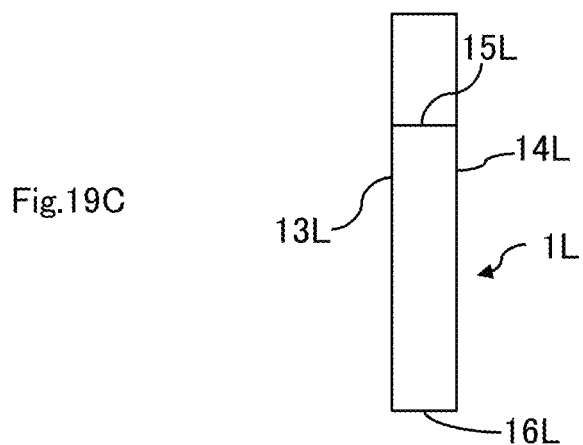

FIGS. 19A to 19C illustrate a configuration example of the waveguide 1K and the waveguide 1L. FIG. 19A is a plan view (a cross-sectional view in the xy plane) of the waveguide 1K and a front view of the waveguide 1L. FIG. 19B is a side view of the waveguide 1K and a plan view (a cross-sectional view in the xy plane) of the waveguide 1L. FIG. 19C is a side view of the waveguide 1K.

In the video image display device 20B, video image light generated by the video image generation unit 21 is incident on the waveguide 1K from an incident surface 11K via the coupling prism 22. The waveguide 1K includes N partial reflection surfaces 17K, and light reflected by the N partial reflection surfaces 17K is transmitted through a first internal reflection surface 13K of the waveguide 1K and incident on an incident surface 11L of the waveguide 1L.

The waveguide 1L includes M partial reflection surfaces 17L. The light incident on the incident surface 11L of the waveguide 1L is reflected by the M partial reflection surfaces 17L, transmitted through a first internal reflection surface 13L of the waveguide 1L, and output to the outside of the waveguide 1L. A part of the light output to the outside of the waveguide 1L is incident on an eye (not illustrated) of the user. The user visually recognizes a video image displayed by the video image display device 20B by perceiving the light incident on the eye.

The N partial reflection surfaces 17K of the waveguide 1K and the M partial reflection surfaces 17L of the waveguide 1L are disposed so as not to be parallel to each other. For example, in the video image display device 20B, light incident on the waveguide 1K from the incident surface 11K is reflected by the N partial reflection surfaces 17K in a process of traveling in a −z-axis direction inside the waveguide 1K, and travels in the x-axis direction. At this time, the light traveling in the x-axis direction is divided into N, depending on which of the N partial reflection surfaces 17K reflects the light.

On the other hand, light incident on the waveguide 1L from the incident surface 11L is reflected by the M partial reflection surfaces 17L in a process of traveling in the x-axis direction inside the waveguide 1L, and travels in a −y-axis direction. At this time, the light traveling in the −y-axis direction is divided, into M depending on which of the M partial reflection surfaces 17L reflects the light. Therefore, when the light incident on the waveguide 1L from the waveguide 1K is output from the first internal reflection surface 13L, the light is divided into N in the z-axis direction and divided into M in the x-axis direction.

In the video image display device 20 and the video image display device 20A described above, the waveguide 1 that divides a light beam into only one direction and the like are adopted. Thus, when an angle of view of a video image generated by the video image generation unit 21 increases, light forming the angle of view of a part of the video image may not reach the eye box 24. For example, in an experiment using the video image display device 20, a part of a video image visually recognized by the user was missing when an angle of view of the video image to be displayed is equal to or greater than 30 degrees.

In contrast, the waveguide 1K and the waveguide 1L divide a light beam into two directions in the video image display device 20B, and thus video image light of a video image generated by the video image generation unit 21 can reach the eye box 24 even when the video image has a wide angle of view. Thus, according to the video image display device 20B, a video image at a wide angle of view can be visually recognized by the user without missing a part of the video image.

<With Regard to Application Example of Video Image Display Device 20 and the Like>

Figure 20A:
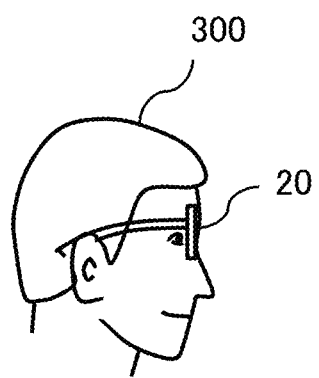
FIGS. 20A and 20B are a diagram illustrating an application example of the video image display device.
Figure 20B:
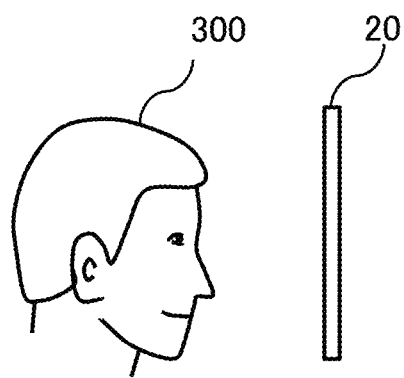

Next, FIGS. 20A and 20B illustrate an application example of the video image display devices 20, 20A, and 20B being the first to third embodiments according to the present invention.

FIG. 20A illustrates one example in which the video image display device 20 and the like are applied to a head-mounted display. The head-mounted display is, for example, mounted on a head of a user 300, and the waveguide 1 (not illustrated) is disposed in a direction of a line of sight of the user 300.

In the head-mounted display, the incident surface 11 (not illustrated) of the waveguide 1 may be disposed in a horizontal direction of an eye of the user and may be disposed in a vertical direction of the eye of the user.

The user 300 can visually recognize a video image displayed by the head-mounted display as a virtual image, for example.

FIG. 20B illustrates one example in which the video image display device 20 and the like are applied to a head-up display. The head-up display is, for example, fixed and disposed in a predetermined position. The user 300 can visually recognize a video image displayed by the head-up display, for example, as a virtual image by getting closer to the head-up display.

The head-up display is applicable to, for example, an assist function for a car driver, a digital signage, and the like.

<Summary>

As described above, the present invention is able to achieve both uniformity of brightness and uniformity of color of the outside world seen via a waveguide and a video image reflected by a partial reflection surface inside the waveguide. Thus, for example, a reduction in realism when a video image of augmented reality (AR) is displayed by a video image display device using the waveguide can be suppressed. The partial reflection surfaces inside the waveguide have a unified reflectance, and thus an increase in manufacturing step and cost can be suppressed.

Note that the effect described in the specification is merely illustrative and is not restrictive, and there may be another effect.

The present invention is not limited to the above-mentioned embodiments, and includes various modification examples. For example, each of the embodiments described above is described in detail for the sake of better understanding of the present invention, and the present invention is not necessarily limited to including all the constituent elements described herein. It is possible to replace a part of a configuration of one embodiment with a configuration of another embodiment. It is also possible to add a configuration of one embodiment to a configuration of another embodiment. It is possible to add, delete, and replace another configuration for a part of a configuration of each of the embodiments.

REFERENCE SIGNS LIST

1 Waveguide
11 Incident surface
12 Terminal surface
13 First internal reflection surface
14 Second internal reflection surface
15 Upper surface
16 Lower surface
17 Partial reflection surface
20 Video image display device
21 Video image generation unit
22 Coupling prism
22A Vertex angle
23 Eye
24 Eye box
31 Light beam
41 Light shielding portion
42 Light shielding portion
45 Light shielding portion
46 Light shielding portion
51 Light shielding portion
61 Protective portion
62 Protective portion
110 Light source portion
114B Condensing lens
114G Condensing lens
114R Condensing lens
115 Cross prism
116 Microlens array
117 Lens
120 Panel portion
121 Panel
130 Projection optical portion
131 Projection lens
201 Coating portion
202 Coating portion
211 Transparent plate
212 Transparent plate
300 User

What is claimed is:

1. A waveguide comprising:
an incident surface on which video image light is incident;
first and second internal reflection surfaces that propagate the video image light incident from the incident surface while totally reflecting the video image light, and are substantially parallel to each other; and
a plurality N of partial reflection surfaces that reflect a part of the video image light propagating by being totally reflected by the first and second internal reflection surfaces, output the part of the video image light as output light from the first internal reflection surface to the outside of the waveguide, and transmit the part of the video image light being incident, and are disposed in substantially parallel to each other inside the waveguide, wherein
intensity Ik of output light reflected by a k-th (k is an integer of equal to or greater than 1 and equal to or less than (N−1)) partial reflection surface is equal to or greater than intensity I(k+1) of output light reflected by a (k+1)-th partial reflection surface disposed adjacent to the k-th partial reflection surface in a direction away from the incident surface,
wherein of the plurality N of partial reflection surfaces, a proportion of intensity IN of output light reflected by an N-th partial reflection surface disposed farthest from the incident surface to intensity I1 of output light reflected by a first partial reflection surface disposed closest to the incident surface is equal to or greater than 0.5.

2. The waveguide according to claim 1, wherein the plurality N of partial reflection surfaces have a substantially equal reflectance.

3. The waveguide according to claim 2, wherein a reflectance R of the plurality N of partial reflection surfaces satisfies the following formula:

$R \leq 1 - 0.5^{(1/(N-1))}$.

4. The waveguide according to claim 1, wherein the plurality N of partial reflection surfaces are substantially parallel to the incident surface.

5. The waveguide according to claim 1, wherein an interval T between the first internal reflection surface and the second internal reflection surface, an angle θ formed between the partial reflection surface and the first or second internal reflection surface, and a lattice spacing SD of the plurality of partial reflection surfaces satisfy the following formula:

$SD \leq T \times \cos \theta$.

6. The waveguide according to claim 5, wherein the lattice spacing SD satisfies the following formula:

$SD \geq T \times \cos \theta / 2$.

7. The waveguide according to claim 1, wherein
when a width of an eye box surface being a range in which a person can visually recognize a video image by the output light at a position away from the first internal reflection surface by a distance ER is EH, and an angle of view of a video image by the output light in a plane perpendicular to the incident surface and the first and second internal reflection surfaces is FH, the number N of the plurality of partial reflection surfaces is equal to or greater than a minimum integer Nmin that satisfies the following formula:

$N_{min} \geq \tan\theta / T \times (2 \times ER \times \tan(FH/2) + EH)$.

8. The waveguide according to claim 1, wherein
the video image light incident on the incident surface has a polarization direction in a plane perpendicular to the incident surface and the first and second internal reflection surfaces.

9. The waveguide according to claim 1, wherein
of surfaces forming an outer shape of the waveguide, a terminal surface present on a side opposite to the incident surface across the plurality of partial reflection surfaces is substantially parallel to the incident surface.

10. The waveguide according to claim 1, further comprising
a first coating portion having a transmittance distribution that substantially uniformizes an intensity distribution of the output light, on at least a part of the outside of the first internal reflection surface as a surface forming an outer shape of the waveguide.

11. The waveguide according to claim 10, further comprising
a second coating portion having a transmittance distribution in which light of a uniform intensity distribution incident from the outside of a housing of the second internal reflection surface is transmitted through the second internal reflection surface and the first internal reflection surface, and is emitted as light of a substantially uniform intensity distribution from the first internal reflection surface, on at least a part of the outside of the second internal reflection surface as a surface forming an outer shape of the waveguide.

12. A video image display device comprising:
a video image generation unit that generates video image light;
a coupling prism; and
a waveguide, wherein
the waveguide includes
an incident surface on which video image light is incident,
first and second internal reflection surfaces that propagate the video image light incident from the incident surface while totally reflecting the video image light, and are substantially parallel to each other, and
a plurality N of partial reflection surfaces that reflect a part of the video image light propagating by being totally reflected by the first and second internal reflection surfaces, output the part of the video image light as output light from the first internal reflection surface to the outside of the waveguide, and transmit the part of the video image light being incident, and are disposed in substantially parallel to each other inside the waveguide, and
intensity Ik of output light reflected by a k-th (k is an integer of equal to or greater than 1 and equal to or less than N) partial reflection surface is equal to or greater than intensity I(k+1) of output light reflected by a (k+1)-th partial reflection surface disposed adjacent to the k-th partial reflection surface in a direction away from the incident surface,
wherein the coupling prism includes a first surface on which the video image light generated by the video image generation unit is incident and a second surface from which the video image light being incident is emitted to the incident surface of the waveguide,
wherein when an angle formed between the partial reflection surface and the second internal reflection surface is θ, an angle formed between the first internal reflection surface and the first surface is substantially 2θ, and
wherein the incident surface and the second surface are substantially parallel to each other.

13. The video image display device according to claim 12, wherein
the coupling prism has a refractive index of a medium substantially identical to a refractive index of a medium of the waveguide.

14. The video image display device according to claim 12, wherein
the video image generation unit includes a projection lens that projects the video image light, and
an exit pupil of the projection lens is present at a position substantially equal to a position of a final surface of the projection lens, or is present on the waveguide side with respect to a final surface of the projection lens.

* * * * *